(12) United States Patent
Wu

(10) Patent No.: US 12,267,788 B2
(45) Date of Patent: Apr. 1, 2025

(54) METHOD AND DEVICE IN NODES USED FOR WIRELESS COMMUNICATION

(71) Applicant: Lu Wu, Shanghai (CN)

(72) Inventor: Lu Wu, Shanghai (CN)

(73) Assignee: Shanghai Codus Technology Company Limited, Shanghai (CN)

( * ) Notice: Subject to any disclaimer, the term of this patent is extended or adjusted under 35 U.S.C. 154(b) by 445 days.

(21) Appl. No.: 17/864,414

(22) Filed: Jul. 14, 2022

(65) Prior Publication Data

US 2023/0014273 A1    Jan. 19, 2023

(30) Foreign Application Priority Data

Jul. 18, 2021    (CN) .......................... 202110810114.2

(51) Int. Cl.
H04W 52/32 (2009.01)
H04L 5/00 (2006.01)
H04W 52/42 (2009.01)

(52) U.S. Cl.
CPC ......... H04W 52/325 (2013.01); H04L 5/0051 (2013.01); H04W 52/42 (2013.01)

(58) Field of Classification Search
CPC ... H04W 52/325; H04W 52/42; H04W 52/16; H04L 5/0051
See application file for complete search history.

(56) References Cited

U.S. PATENT DOCUMENTS

| 2020/0245253 | A1  | 7/2020  | Chen et al. |            |
|--------------|-----|---------|-------------|------------|
| 2020/0404593 | A1* | 12/2020 | Yao ........................ | H04W 52/54 |
| 2021/0007060 | A1  | 1/2021  | Chen        |            |
| 2021/0153132 | A1* | 5/2021  | Chen .................... | H04W 52/10 |

FOREIGN PATENT DOCUMENTS

| CN | 109803362 A | 5/2019 |
| CN | 110800342 A | 2/2020 |
| CN | 111867032 A | 10/2020 |
| WO | 2019214537 A1 | 11/2019 |
| WO | 2020216015 A1 | 10/2020 |

OTHER PUBLICATIONS

First Office Action of Chinese patent application No. CN202110810114.2 dated May 13, 2024.
First Search Report of Chinese patent application No. CN202110810114.2 dated May 9, 2024.
Qualcomm Incorporated "SRS Power Control" 3GPP TSG-RAN WG1 #70 R1-123693 Aug. 5, 2012.

* cited by examiner

Primary Examiner — Farid Seyedvosoghi

(57) ABSTRACT

A method and a device in nodes used for wireless communication. A first node transmits a first reference signal and a second reference signal respectively in a first time-domain resource block and a second time-domain resource block. The first node maintains power consistency and phase continuity among multiple first-type signals belonging to a reference time window in time domain; a duration of the reference time window is no larger than a first threshold; the first reference signal and the second reference signal respectively belong to different transmission occasions; whether the first node maintains power consistency and phase continuity between the first reference signal and the second reference signal is related to whether a first condition set is satisfied; the first condition set comprises a first condition; the first condition comprises: the first reference signal and the second reference signal being identified by a same index.

20 Claims, 4 Drawing Sheets (a) With first condition set being satisfied (b) With first condition set not being satisfied

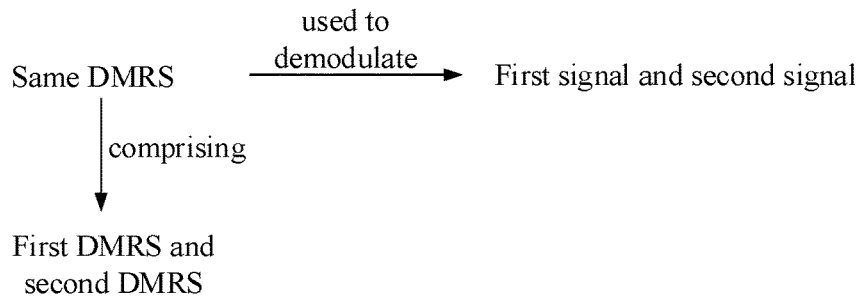
FIG. 10
FIG. 11
FIG. 12
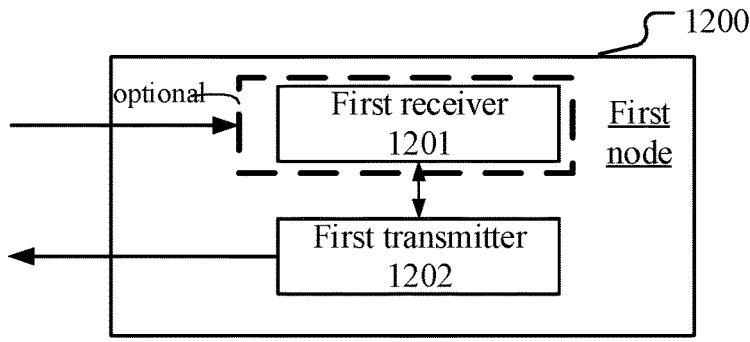
FIG. 13
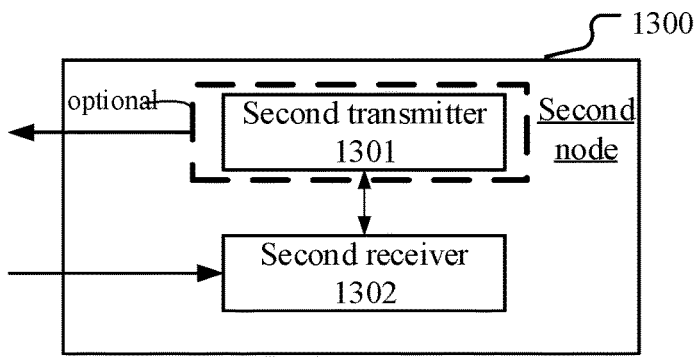
FIG. 14

METHOD AND DEVICE IN NODES USED FOR WIRELESS COMMUNICATION

CROSS REFERENCE TO RELATED APPLICATIONS

This application claims the priority benefit of Chinese Patent Application No. 202110810114.2, filed on Jul. 18, 2021, the full disclosure of which is incorporated herein by reference.

BACKGROUND

Technical Field

The present application relates to transmission methods and devices in wireless communication systems, and in particular to a method and device for radio signal transmission in a wireless communication system supporting cellular networks.

Related Art

In a 5G system, for the purpose of enhancing coverage, a Work Item (WI) of coverage enhancement has been approved in New Radio (NR) Release 17 at the 3rd Generation Partner Project (3GPP) Radio Access Network (RAN) #90e Plenary, and an agreement was reached at the RAN1 #conference upon supporting power consistency and phase continuity among Back-to-Back Physical Uplink Shared CHannels (PUSCHs), thus providing support to combined channel estimation and enhancement of PUSCH coverage.

In further evolutions of the 5G system, the enhancement of uplink transmission capacity offers an important direction of research. There is a key issue of acquiring an accurate uplink channel by an uplink reference signal measurement in this regard.

SUMMARY

The inventors find through researches that if both power consistency and phase continuity are satisfied between two reference signals, more precise channel information can be acquired through a combined channel estimation, so, how to determine whether power consistency and phase continuity are maintained between these reference signals becomes a key problem.

To address the above problem, the present application provides a solution. It should be noted that though the present application only took the uplink as an exemplary scenario in the statement above, it is also applicable to other scenarios such as the downlink and sidelink, where similar technical effects can be achieved. Additionally, the adoption of a unified solution for various scenarios, including but not limited to UL, DL and SL, contributes to the reduction of hardcore complexity and costs. In the case of no conflict, the embodiments of any node and the characteristics in the embodiments may be applied to any other node, and vice versa. What's more, the embodiments in the present application and the characteristics in the embodiments can be arbitrarily combined if there is no conflict.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

The present application provides a method in a first node for wireless communications, comprising:

transmitting a first reference signal and a second reference signal respectively in a first time-domain resource block and a second time-domain resource block;

herein, the first node maintains power consistency and phase continuity among multiple first-type signals belonging to a reference time window in time domain; a duration of the reference time window is not larger than a first threshold; the first time-domain resource block and the second time-domain resource block are orthogonal, at least one of the first time-domain resource block or the second time-domain resource block belonging to the reference time window; the first reference signal and the second reference signal respectively belong to different transmission occasions; whether the first node maintains power consistency and phase continuity between the first reference signal and the second reference signal is related to whether a first condition set is being satisfied; when and only when the first condition set is satisfied, the first node maintains the power consistency and phase continuity between the first reference signal and the second reference signal; the first condition set comprises a first condition; the first condition comprises: the first reference signal and the second reference signal being identified by a same index, and, the first time-domain resource block and the second time-domain resource block both belonging to the reference time window.

In one embodiment, a problem to be solved in the present application includes: how to determine whether power consistency and phase continuity between two reference signals are maintained.

In one embodiment, the essence of the above method lies in that a first reference signal and a second reference signal are respectively two reference signals, a first-type signal is a transmission, and whether power consistency and phase continuity between these two reference signals are maintained is determined according to whether a first condition set is being satisfied.

In one embodiment, the essence of the above method lies in that a first reference signal and a second reference signal are respectively two SRSs, a first-type signal is a PUSCH, a UE is expected to maintain power consistency and phase continuity between multiple PUSCH repetitions within a reference time window; whether the UE is expected to maintain power consistency and phase continuity between these SRSs is determined according to whether a first condition set is being satisfied. The first condition comprises that these two SRSs respectively belong to two transmission occasions of a same SRS resource, and time-domain resources occupied by these two SRSs belong to a reference time window.

In one embodiment, the above method is advantageous in identifying conditions for maintaining power consistency and phase continuity between two reference signals, thus ensuring the uniformity between receiving and transmitting ends.

In one embodiment, the above method is advantageous in enhancing the precision of channel estimation through power consistency and phase continuity between multiple reference signals, thus increasing the transmission capacity.

According to one aspect of the present application, characterized in that the first condition set comprises more than one condition, with the first condition being a condition in the first condition set; when each condition in the first condition set is satisfied, the first condition set is satisfied; the first condition set also comprises a second condition, the second condition being a condition in the first condition set; the second condition comprises frequency-domain resources occupied by the first reference signal and frequency-domain resources occupied by the second reference signal being the same.

According to one aspect of the present application, characterized in that the second time-domain resource block is later than the first time-domain resource block; when the first condition set is satisfied, a phrase of "the power consistency between the first reference signal and the second reference signal" means that a power of the second reference signal follows a power of the first reference signal.

According to one aspect of the present application, characterized in that time-frequency resources occupied by the first reference signal and time-frequency resources occupied by the second reference signal are related to whether the first condition set is being satisfied; when the first condition set is satisfied, a first reference signal pattern is used to determine the time-frequency resources occupied by the first reference signal and the time-frequency resources occupied by the second reference signal; when the first condition set is not being satisfied, a second reference signal pattern is used to determine the time-frequency resources occupied by the first reference signal and the time-frequency resources occupied by the second reference signal; the first reference signal pattern is different from the second reference signal pattern.

According to one aspect of the present application, characterized in comprising:
receiving a first signaling; and
transmitting a first signal and a second signal respectively in a third time-domain resource block and a fourth time-domain resource block;
herein, the first signaling is used to indicate the third time-domain resource block and the fourth time-domain resource block, the third time-domain resource block and the fourth time-domain resource block being orthogonal, the third time-domain resource block and the fourth time-domain resource block both belong to the reference time window, each of the first signal and the second signal is a first-type signal, the first node maintains power consistency and phase continuity between the first signal and the second signal; each of the first reference signal and the second reference signal is a first-type reference signal, where the first-type signals are different from the first-type reference signals.

According to one aspect of the present application, characterized in comprising:
transmitting a first DeModulation Reference Signal (DMRS) and a second DMRS respectively in the third time-domain resource block and the fourth time-domain resource block;
herein, a same DMRS is used for demodulating the first signal and the second signal, the same DMRS including the first DMRS and the second DMRS.

In one embodiment, the essence of the above method lies in that a same DeModulation Reference Signal (DMRS) can be shared by multiple transmissions among which power consistency and phase continuity are maintained.

In one embodiment, the essence of the above method lies in that a combined channel estimation can be performed on multiple transmissions among which power consistency and phase continuity are maintained.

In one embodiment, the above method is advantageous in increasing the reliability of multiple transmissions among which power consistency and phase continuity are maintained.

According to one aspect of the present application, characterized in that when the first condition set is satisfied, a phrase of "the power consistency between the first reference signal and the second reference signal" means that both a power of the first reference signal and a power of the second reference signal are related to a power of the first signal.

The present application provides a method in a second node for wireless communications, comprising:
receiving a first reference signal and a second reference signal respectively in a first time-domain resource block and a second time-domain resource block;
herein, a transmitter of the first reference signal and the second reference signal maintains power consistency and phase continuity among multiple first-type signals belonging to a reference time window in time domain; a duration of the reference time window is not larger than a first threshold; the first time-domain resource block and the second time-domain resource block are orthogonal, at least one of the first time-domain resource block or the second time-domain resource block belonging to the reference time window; the first reference signal and the second reference signal respectively belong to different transmission occasions; whether the transmitter of the first reference signal and the second reference signal maintains power consistency and phase continuity between the first reference signal and the second reference signal depends on whether a first condition set is being satisfied; when and only when the first condition set is satisfied, the transmitter of the first reference signal and the second reference signal maintains the power consistency and phase continuity between the first reference signal and the second reference signal; the first condition set comprises a first condition; the first condition comprises: the first reference signal and the second reference signal being identified by a same index, and, the first time-domain resource block and the second time-domain resource block both belonging to the reference time window.

According to one aspect of the present application, characterized in that the first condition set comprises more than one condition, with the first condition being a condition in the first condition set; when each condition in the first condition set is satisfied, the first condition set is satisfied; the first condition set also comprises a second condition, the second condition being a condition in the first condition set; the second condition comprises frequency-domain resources occupied by the first reference signal and frequency-domain resources occupied by the second reference signal being the same.

According to one aspect of the present application, characterized in that the second time-domain resource block is later than the first time-domain resource block; when the first condition set is satisfied, the phrase of "the power consistency between the first reference signal and the second reference signal" means that a power of the second reference signal follows a power of the first reference signal.

According to one aspect of the present application, characterized in that time-frequency resources occupied by the first reference signal and time-frequency resources occupied by the second reference signal are related to whether the first condition set is being satisfied; when the first condition set is satisfied, a first reference signal pattern is used to determine the time-frequency resources occupied by the first reference signal and the time-frequency resources occupied by the second reference signal; when the first condition set is not being satisfied, a second reference signal pattern is used to determine the time-frequency resources occupied by the first reference signal and the time-frequency resources occupied by the second reference signal; the first reference signal pattern is different from the second reference signal pattern.

According to one aspect of the present application, characterized in comprising:
  transmitting a first signaling; and
  receiving a first signal and a second signal respectively in a third time-domain resource block and a fourth time-domain resource block;
  herein, the first signaling is used to indicate the third time-domain resource block and the fourth time-domain resource block, the third time-domain resource block and the fourth time-domain resource block being orthogonal, the third time-domain resource block and the fourth time-domain resource block both belong to the reference time window, each of the first signal and the second signal is a first-type signal, the transmitter of the first reference signal and the second reference signal maintains power consistency and phase continuity between the first signal and the second signal; each of the first reference signal and the second reference signal a first-type reference signal, where the first-type signals are different from the first-type reference signals.

According to one aspect of the present application, characterized in comprising:
  receiving a first DeModulation Reference Signal (DMRS) and a second DMRS respectively in the third time-domain resource block and the fourth time-domain resource block;
  herein, a same DMRS is used for demodulating the first signal and the second signal, the same DMRS including the first DMRS and the second DMRS.

According to one aspect of the present application, characterized in that when the first condition set is satisfied, the phrase of "the power consistency between the first reference signal and the second reference signal" means that both a power of the first reference signal and a power of the second reference signal are related to a power of the first signal.

The present application provides a first node for wireless communications, comprising:
  a first transmitter, transmitting a first reference signal and a second reference signal respectively in a first time-domain resource block and a second time-domain resource block;
  herein, the first node maintains power consistency and phase continuity among multiple first-type signals belonging to a reference time window in time domain; a duration of the reference time window is not larger than a first threshold; the first time-domain resource block and the second time-domain resource block are orthogonal, at least one of the first time-domain resource block or the second time-domain resource block belonging to the reference time window; the first reference signal and the second reference signal respectively belong to different transmission occasions; whether the first node maintains power consistency and phase continuity between the first reference signal and the second reference signal is related to whether a first condition set is being satisfied; when and only when the first condition set is satisfied, the first node maintains the power consistency and phase continuity between the first reference signal and the second reference signal; the first condition set comprises a first condition; the first condition comprises: the first reference signal and the second reference signal being identified by a same index, and, the first time-domain resource block and the second time-domain resource block both belonging to the reference time window.

The present application provides a second node for wireless communications, comprising:
  a second receiver, receiving a first reference signal and a second reference signal respectively in a first time-domain resource block and a second time-domain resource block;
  herein, a transmitter of the first reference signal and the second reference signal maintains power consistency and phase continuity among multiple first-type signals belonging to a reference time window in time domain; a duration of the reference time window is not larger than a first threshold; the first time-domain resource block and the second time-domain resource block are orthogonal, at least one of the first time-domain resource block or the second time-domain resource block belonging to the reference time window; the first reference signal and the second reference signal respectively belong to different transmission occasions; whether the transmitter of the first reference signal and the second reference signal maintains power consistency and phase continuity between the first reference signal and the second reference signal depends on whether a first condition set is being satisfied; when and only when the first condition set is satisfied, the transmitter of the first reference signal and the second reference signal maintains the power consistency and phase continuity between the first reference signal and the second reference signal; the first condition set comprises a first condition; the first condition comprises: the first reference signal and the second reference signal being identified by a same index, and, the first time-domain resource block and the second time-domain resource block both belonging to the reference time window.

In one embodiment, compared with the prior art, the present application is advantageous in the following aspects:
  identifying conditions for maintaining power consistency and phase continuity between two reference signals;
  ensuring the uniformity between receiving and transmitting ends;
  enhancing the precision of channel estimation through power consistency and phase continuity between multiple reference signals, thus increasing the transmission capacity;
  realizing the combined channel estimation between two reference signals by maintaining power consistency and phase continuity between these reference signals; and increasing the reliability of multiple transmissions among which power consistency and phase continuity are maintained.

BRIEF DESCRIPTION OF THE DRAWINGS

Other features, objects and advantages of the present application will become more apparent from the detailed description of non-restrictive embodiments taken in conjunction with the following drawings:

FIG. 10 illustrates a schematic diagram of a first DMRS and a second DMRS according to one embodiment of the present application.

FIG. 11 illustrates a schematic diagram of a first reference signal power and a second reference signal power according to one embodiment of the present application.

FIG. 12 illustrates a schematic diagram of a first reference signal power and a second reference signal power according to another embodiment of the present application.

FIG. 13 illustrates a structure block diagram of a processing device in a first node according to one embodiment of the present application.

FIG. 14 illustrates a structure block diagram of a processing device used in a second node according to one embodiment of the present application.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
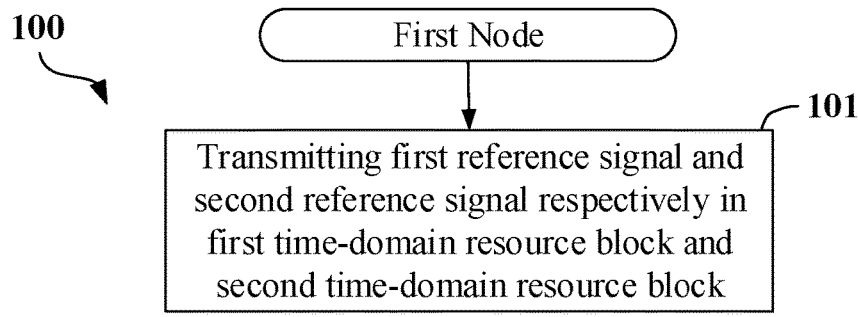
FIG. 1 illustrates a flowchart of a first reference signal and a second reference signal according to one embodiment of the present application.

Embodiment 1 illustrates a flowchart of a first reference signal and a second reference signal according to one embodiment of the present application, as shown in FIG. 1. In 100 illustrated by FIG. 1, each box represents a step.

In Embodiment 1, the first node in the present application transmits a first reference signal and a second reference signal respectively in a first time-domain resource block and a second time-domain resource block in step 101; herein, the first node maintains power consistency and phase continuity among multiple first-type signals belonging to a reference time window in time domain; a duration of the reference time window is not larger than a first threshold; the first time-domain resource block and the second time-domain resource block are orthogonal, at least one of the first time-domain resource block or the second time-domain resource block belonging to the reference time window; the first reference signal and the second reference signal respectively belong to different transmission occasions; whether the first node maintains power consistency and phase continuity between the first reference signal and the second reference signal is related to whether a first condition set is being satisfied; when and only when the first condition set is satisfied, the first node maintains the power consistency and phase continuity between the first reference signal and the second reference signal; the first condition set comprises a first condition; the first condition comprises: the first reference signal and the second reference signal being identified by a same index, and, the first time-domain resource block and the second time-domain resource block both belonging to the reference time window.

In one embodiment, the first time-domain resource block comprises at least one symbol, while the second time-domain resource block comprises at least one symbol.

In one embodiment, the first time-domain resource block comprises one symbol or multiple consecutive symbols, while the second time-domain resource block comprises one symbol or multiple consecutive symbols.

In one embodiment, the first time-domain resource block consists of time-domain resources occupied by the first reference signal, while the second time-domain resource block consists of time-domain resources occupied by the second reference signal.

In one embodiment, the first time-domain resource block only comprises time-domain resources occupied by the first reference signal, while the second time-domain resource block only comprises time-domain resources occupied by the second reference signal.

In one embodiment, the first time-domain resource block comprises time-domain resources occupied by the first reference signal, and the first time-domain resource block also comprises time-domain resources other than those occupied by the first reference signal.

In one embodiment, the second time-domain resource block comprises time-domain resources occupied by the second reference signal, and the second time-domain resource block also comprises time-domain resources other than those occupied by the second reference signal.

In one embodiment, the phrase of "time-domain resources occupied" refers to symbols being occupied.

In one embodiment, the phrase of "time-domain resources occupied" refers to time being occupied.

In one embodiment, when the first reference signal and the second reference signal are identified by a same index, the total time comprised in the first time-domain resource block is the same as that comprised in the second time-domain resource block.

In one embodiment, when the first reference signal and the second reference signal are identified by a same index, a number of symbols comprised in the first time-domain resource block is the same as that comprised in the second time-domain resource block.

In one embodiment, the second time-domain resource block is later than the first time-domain resource block.

In one embodiment, the second time-domain resource block is no earlier than the first time-domain resource block.

In one embodiment, the phrase that "the second time-domain resource block is later than the first time-domain resource block" means that a start time of the second time-domain resource block is later than an end time of the first time-domain resource block.

In one embodiment, the phrase that "the second time-domain resource block is later than the first time-domain resource block" means that a start time of the second time-domain resource block is later than a start time of the first time-domain resource block.

In one embodiment, the phrase that "the second time-domain resource block is later than the first time-domain resource block" means that an end time of the second time-domain resource block is later than an end time of the first time-domain resource block.

In one embodiment, the phrase that "the second time-domain resource block is no earlier than the first time-domain resource block" means that a start time of the second time-domain resource block is no earlier than an end time of the first time-domain resource block.

In one embodiment, the phrase that "the second time-domain resource block is no earlier than the first time-domain resource block" means that a start time of the second time-domain resource block is no earlier than a start time of the first time-domain resource block.

In one embodiment, the phrase that "the second time-domain resource block is no earlier than the first time-domain resource block" means that an end time of the second time-domain resource block is no earlier than an end time of the first time-domain resource block.

In one embodiment, only the first time-domain resource block of the first time-domain resource block and the second time-domain resource block belongs to the reference time window.

In one embodiment, only the second time-domain resource block of the first time-domain resource block and the second time-domain resource block belongs to the reference time window.

In one embodiment, the first time-domain resource block and the second time-domain resource block both belong to the reference time window.

In one embodiment, the symbol is a single-carrier symbol.

In one embodiment, the symbol is a multi-carrier symbol.

In one embodiment, the multicarrier symbol is an Orthogonal Frequency Division Multiplexing (OFDM) Symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multi Carrier (FBMC) symbol.

In one embodiment, the multicarrier symbol comprises a Cyclic Prefix (CP).

In one embodiment, the phrase that "the first time-domain resource block and the second time-domain resource block are orthogonal" comprises a meaning that the first time-domain resource block and the second time-domain resource block are non-overlapping.

In one embodiment, the phrase that "the first time-domain resource block and the second time-domain resource block are orthogonal" comprises a meaning that the first time-domain resource block and the second time-domain resource block do not comprise a same symbol.

In one embodiment, the phrase that "the first time-domain resource block and the second time-domain resource block are orthogonal" comprises a meaning that any symbol in the first time-domain resource block does not belong to the second time-domain resource block.

In one embodiment, the reference time window comprises at least one symbol.

In one embodiment, the reference time window comprises one symbol or multiple consecutive symbols.

In one embodiment, the reference time window comprises a contiguous period of time.

In one embodiment, the reference time window is indicated by a higher-layer signaling.

In one embodiment, the reference time window is indicated by an RRC signaling.

In one embodiment, a duration of the reference time window is indicated by a higher-layer parameter.

In one embodiment, a number of symbols comprised in the reference time window is indicated by a higher-layer parameter.

In one embodiment, a number of repetitions comprised in the reference time window is indicated by a higher-layer parameter.

In one embodiment, a duration of the reference time window is smaller than a first threshold.

In one embodiment, a duration of the reference time window is equal to a first threshold.

In one embodiment, a duration of the reference time window is smaller than or equal to a first threshold.

In one embodiment, the first threshold is configured by a higher layer parameter.

In one embodiment, the first threshold is reported to a target receiver of the first reference signal and the second reference signal by the first node.

In one embodiment, the first threshold is configured by a target receiver of the first reference signal and the second reference signal according to a report of capabilities of the first node.

In one embodiment, the first threshold is configured by a target receiver of the first reference signal and the second reference signal according to a report of capabilities of the first node.

In one embodiment, the first threshold is measured in milliseconds (ms).

In one embodiment, the first threshold is measured in symbols.

In one embodiment, the first threshold is measured in repetitions.

In one embodiment, the first threshold is a number of repetitions.

In one embodiment, the first threshold is a positive integer.

In one embodiment, the first threshold is a positive real number.

In one embodiment, the first threshold is measured in milliseconds (ms), while a duration of the reference time window is measured in ms; the phrase of "a duration of the reference time window" refers to total time comprised in the reference time window.

In one embodiment, the first threshold is measured in milliseconds (ms), while a duration of the reference time window is measured in ms; the phrase of "a duration of the reference time window" is equal to a product of a number of symbols comprised in the reference time window and the total time occupied by a symbol.

In one embodiment, the first threshold is measured in milliseconds (ms), while a duration of the reference time window is measured in ms; the phrase of "a duration of the reference time window" is equal to a product of a number of repetitions comprised in the reference time window and time occupied by a repetition.

In one embodiment, the first threshold is measured in symbols, while a duration of the reference time window is measured in symbols; the phrase of "a duration of the reference time window" refers to a number of symbols comprised in the reference time window.

In one embodiment, the first threshold is measured in repetitions, while a duration of the reference time window is measured in repetitions; the phrase of "a duration of the reference time window" refers to a number of repetitions comprised in the reference time window.

In one embodiment, the number of repetitions comprised in the reference time window refers to a total number of repetitions of a first bit block in the reference time window, the first bit block comprising at least one bit.

In one embodiment, the number of repetitions comprised in the reference time window refers to a total number of repetitions of a bit block in the reference time window, the bit block comprising at least one bit.

In one embodiment, the number of repetitions comprised in the reference time window refers to a total number of repetitions of first-type signals in the reference time window.

In one embodiment, a first bit block is carried by a first-type signal.

In one embodiment, a higher-layer signaling is used to indicate the first time-domain resource block.

In one embodiment, a higher-layer parameter is used to indicate the first time-domain resource block.

In one embodiment, an RRC signaling is used to indicate the first time-domain resource block.

In one embodiment, an RRC parameter is used to indicate the first time-domain resource block.

In one embodiment, a physical-layer signaling is used to indicate the first time-domain resource block.

In one embodiment, a DCI signaling is used to indicate the first time-domain resource block.

In one embodiment, a higher-layer signaling is used to indicate the second time-domain resource block.

In one embodiment, a higher-layer parameter is used to indicate the second time-domain resource block.

In one embodiment, an RRC signaling is used to indicate the second time-domain resource block.

In one embodiment, an RRC parameter is used to indicate the second time-domain resource block.

In one embodiment, a physical-layer signaling is used to indicate the second time-domain resource block.

In one embodiment, a DCI signaling is used to indicate the second time-domain resource block.

In one embodiment, the first time-domain resource block and the second time-domain resource block are respectively indicated by different signalings.

In one embodiment, the first time-domain resource block and the second time-domain resource block are indicated by a same signaling.

In one embodiment, when the first reference signal and the second reference signal are identified by a same index, the first time-domain resource block and the second time-domain resource block are indicated by a same signaling.

In one embodiment, when the first reference signal and the second reference signal are identified by different indexes, the first time-domain resource block and the second time-domain resource block are indicated by a same signaling.

In one embodiment, when the first reference signal and the second reference signal are identified by different indexes, the first time-domain resource block and the second time-domain resource block are respectively indicated by different signalings.

In one embodiment, the first reference signal is identified by a first index, while the second reference signal is identified by a second index; the first index is a non-negative integer, and the second index is a non-negative integer.

In one embodiment, when the first index and the second index are the same, the first time-domain resource block and the second time-domain resource block respectively comprise two transmission occasions of a reference signal resource identified by the first index.

In one embodiment, when the first index and the second index are the same, the first time-domain resource block and the second time-domain resource block respectively belong to two transmission occasions of a reference signal resource identified by the first index.

In one embodiment, when the first index and the second index are different, the first time-domain resource block comprises a transmission occasion of a reference signal resource identified by the first index, while the second time-domain resource block comprises a transmission occasion of a reference signal resource identified by the second index.

In one embodiment, when the first index and the second index are different, the first time-domain resource block belongs to a transmission occasion of a reference signal resource identified by the first index, while the second time-domain resource block belongs to a transmission occasion of a reference signal resource identified by the second index.

In one embodiment, the phrase that "the first reference signal and the second reference signal respectively belong to different transmission occasions" comprises a meaning that the first reference signal is identified by a first index, the second reference signal is identified by a second index, the first index and the second index being different; the first reference signal belongs to a transmission occasion of a reference signal resource identified by the first index while the second reference signal belongs to a transmission occasion of a reference signal resource identified by the second index.

In one embodiment, the phrase that "the first reference signal and the second reference signal respectively belong to different transmission occasions" comprises a meaning that the first reference signal and the second reference signal are both identified by a first index; the first reference signal and the second reference signal respectively belong to two transmission occasions of a reference signal resource identified by the first index.

In one embodiment, the phrase that "the first reference signal and the second reference signal respectively belong to different transmission occasions" comprises a meaning that the first time-domain resource block and the second time-domain resource block respectively comprise different transmission occasions.

In one embodiment, the phrase that "the first reference signal and the second reference signal respectively belong to different transmission occasions" comprises a meaning that the first time-domain resource block and the second time-domain resource block respectively belong to different transmission occasions.

In one embodiment, the phrase that "the first time-domain resource block and the second time-domain resource block respectively comprise different transmission occasions"

comprises a meaning that when the first index and the second index are the same, the first time-domain resource block and the second time-domain resource block respectively comprise two transmission occasions of a reference signal resource identified by the first index.

In one embodiment, the phrase that "the first time-domain resource block and the second time-domain resource block respectively belong to different transmission occasions" comprises a meaning that when the first index and the second index are the same, the first time-domain resource block and the second time-domain resource block respectively belong to two transmission occasions of a reference signal resource identified by the first index.

In one embodiment, the phrase that "the first time-domain resource block and the second time-domain resource block respectively comprise different transmission occasions" comprises a meaning that when the first index and the second index are different, the first time-domain resource block comprises a transmission occasion of a reference signal resource identified by the first index, while the second time-domain resource block comprises a transmission occasion of a reference signal resource identified by the second index.

In one embodiment, the phrase that "the first time-domain resource block and the second time-domain resource block respectively belong to different transmission occasions" comprises a meaning that when the first index and the second index are different, the first time-domain resource block belongs to a transmission occasion of a reference signal resource identified by the first index, while the second time-domain resource block belongs to a transmission occasion of a reference signal resource identified by the second index.

In one embodiment, the phrase of "being used to indicate" means: indicating explicitly.

In one embodiment, the phrase of "being used to indicate" means: indicating implicitly.

In one embodiment, the phrase of "being used to indicate" means: indicating directly.

In one embodiment, the phrase of "being used to indicate" means: indicating indirectly.

In one embodiment, the phrase of "being used to indicate" means: being used to determine.

In one embodiment, a said transmission occasion comprises at least one symbol.

In one embodiment, a said transmission occasion comprises one symbol or multiple consecutive symbols.

In one embodiment, a said transmission occasion comprises a contiguous period of time.

In one embodiment, a said transmission occasion comprises one slot.

In one embodiment, a said transmission occasion comprises one subframe.

In one embodiment, the specific definition of the said transmission occasion can be found in 3GPP TS38.214.

In one embodiment, a transmission occasion of a reference signal resource comprises one occurrence of the reference signal resource.

In one embodiment, a transmission occasion of a reference signal resource comprises one of multiple occurrences of the reference signal resource.

In one embodiment, a transmission occasion of a reference signal resource comprises one of multiple periodic occurrences of the reference signal resource.

In one embodiment, a transmission occasion of a reference signal resource comprises time-domain resources occupied by one transmission of the reference signal resource.

In one embodiment, a transmission occasion of a reference signal resource is composed of time-domain resources occupied by one transmission of the reference signal resource.

In one embodiment, a transmission occasion of a reference signal resource comprises a slot to which one transmission of the reference signal resource belongs in time domain.

In one embodiment, a transmission occasion of a reference signal resource comprises a subframe to which one transmission of the reference signal resource belongs in time domain.

In one embodiment, the first reference signal and the second reference signal are respectively Sounding Reference Signals (SRS).

In one embodiment, neither of the first reference signal and the second reference signal are the first-type signals.

In one embodiment, the first reference signal and the second reference signal are respectively reference signals other than DeModulation Reference Signals (DMRS).

In one embodiment, neither of the first reference signal and the second reference signal are DeModulation Reference Signals (DMRS).

In one embodiment, the first reference signal and the second reference signal are unrelated to demodulation of the first-type signals.

In one embodiment, the first reference signal and the second reference signal are respectively uplink reference signals.

In one embodiment, the first reference signal and the second reference signal are respectively Sounding Reference Signals (SRS).

In one embodiment, the first reference signal and the second reference signal are respectively Sounding Reference Signals (SRS), while the first-type signal is a PUSCH.

In one embodiment, the first reference signal and the second reference signal are respectively Phase Tracking Reference Signals (PTRS).

In one embodiment, the first reference signal is of a same type as the second reference signal.

In one embodiment, the type of a reference signal includes at least one of an SRS, a Channel State Information-Reference Signal (CSI-RS), a Phase Tracking Reference Signal (PTRS), a Synchronization Signal/Physical broadcast channel (SS/PBCH) block.

In one embodiment, the uplink reference signal comprises an SRS.

In one embodiment, the uplink reference signal comprises at least one of an SRS or a PTRS.

In one embodiment, the first reference signal is a periodic reference signal.

In one embodiment, the first reference signal is a semi-persistent reference signal.

In one embodiment, the first reference signal is an aperiodic reference signal.

In one embodiment, the second reference signal is a periodic reference signal.

In one embodiment, the second reference signal is a semi-persistent reference signal.

In one embodiment, the second reference signal is an aperiodic reference signal.

In one embodiment, the reference signal comprises a reference signal resource.

In one embodiment, the reference signal comprises a reference signal port.

In one embodiment, modulation symbols comprised in the reference signal are known to the first node.

In one embodiment, the first-type signal comprises one bit block transmission.

In one embodiment, the first-type signal comprises one bit block repetition.

In one embodiment, the first-type signal comprises an uplink transmission.

In one embodiment, the first-type signal comprises a Physical Uplink Shared Channel (PUSCH) transmission.

In one embodiment, the first-type signal comprises a Physical Uplink Control CHannel (PUCCH) transmission.

In one embodiment, the first-type signal comprises at least one of a PUSCH transmission or a PUCCH transmission.

In one embodiment, the phrase of "one bit block repetition" refers to an actual repetition of a bit block.

In one embodiment, the phrase of "one bit block repetition" refers to a nominal repetition of a bit block.

In one embodiment, the phrase of "repetition of a first bit block" refers to an actual repetition of a first bit block.

In one embodiment, the phrase of "repetition of a first bit block" refers to a nominal repetition of a first bit block.

In one embodiment, the phrase of "repetition of a first-type signal" refers to an actual repetition of a first-type signal.

In one embodiment, the phrase of "repetition of a first-type signal" refers to a nominal repetition of a first-type signal.

In one embodiment, the phrase of "repetition" refers to an actual repetition.

In one embodiment, the phrase of "repetition" refers to a nominal repetition.

In one embodiment, when the first reference signal and the second reference signal are identified by a same index, a number of symbols comprised in the first time-domain resource block equals that comprised in the second time-domain resource block; when the first reference signal and the second reference signal are respectively identified by different indexes, a number of symbols comprised in the first time-domain resource block and a number of symbols comprised in the second time-domain resource block are respectively indicated by different higher-layer parameters.

In one embodiment, the first reference signal is identified by a first index, while the second reference signal is identified by a second index, the first index being a non-negative integer, the second index being a non-negative integer; the phrase that "the first reference signal and the second reference signal are identified by a same index" comprises a meaning that the first index and the second index are the same; the phrase that "the first reference signal and the second reference signal are respectively identified by different indexes" comprises a meaning that the first index and the second index are different.

In one embodiment, the first reference signal is identified by a first index, while the second reference signal is identified by a second index, the first index being a non-negative integer, the second index being a non-negative integer; the phrase that "the first reference signal and the second reference signal are identified by a same index" comprises a meaning that the first index and the second index are the same, the first reference signal and the second reference signal respectively belonging to two transmission occasions of a reference signal resource identified by the first index; the phrase that "the first reference signal and the second reference signal are respectively identified by different indexes" comprises a meaning that the first index and the second index are different, the first reference signal belongs to a transmission occasion of a reference signal resource identified by the first index while the second reference signal belongs to a transmission occasion of a reference signal resource identified by the second index.

In one embodiment, an index for identifying a reference signal is a non-negative integer.

In one embodiment, configuration information for a reference signal includes an index for identifying a reference signal.

In one embodiment, the first reference signal is identified by a first index, while the second reference signal is identified by a second index; the first index is a non-negative integer, and the second index is a non-negative integer.

In one embodiment, the first index is indicated by a higher-layer parameter, and the second index is indicated by a higher-layer parameter.

In one embodiment, names for a higher-layer parameter for indicating the first index include SRS-ResourceSetId, while names for a higher-layer parameter for indicating the second index include SRS-ResourceSetId.

In one embodiment, names for a higher-layer parameter for indicating the first index include srs-ResourceSetId, while names for a higher-layer parameter for indicating the second index include srs-ResourceSetId.

In one embodiment, names for a higher-layer parameter for indicating the first index include SRS-ResourceId, while names for a higher-layer parameter for indicating the second index include SRS-ResourceId.

In one embodiment, names for a higher-layer parameter for indicating the first index include srs-ResourceId, while names for a higher-layer parameter for indicating the second index include srs-ResourceId.

In one embodiment, for the specific definition of the SRS-ResourceSetId and the SRS-ResourceId, refer to 3GPP TS38.331, Chapter 6.3.2.

In one embodiment, for the specific definition of the srs-ResourceSetId and the srs-ResourceId, refer to 3GPP TS38.214, Chapter 6.2.

In one embodiment, the higher-layer parameter comprises an RRC parameter.

In one embodiment, the higher-layer parameter comprises a MAC CE parameter.

In one embodiment, the higher-layer signaling comprises an RRC signaling.

In one embodiment, the higher-layer signaling comprises a MAC CE signaling.

In one embodiment, the phrase that "a reference signal belongs to a transmission occasion" means that time-domain resources occupied by a reference signal belong to a transmission occasion.

In one embodiment, the phrase that "a reference signal belongs to a transmission occasion" means that time-domain resources occupied by a reference signal comprise a transmission occasion.

Embodiment 2

Figure 2:
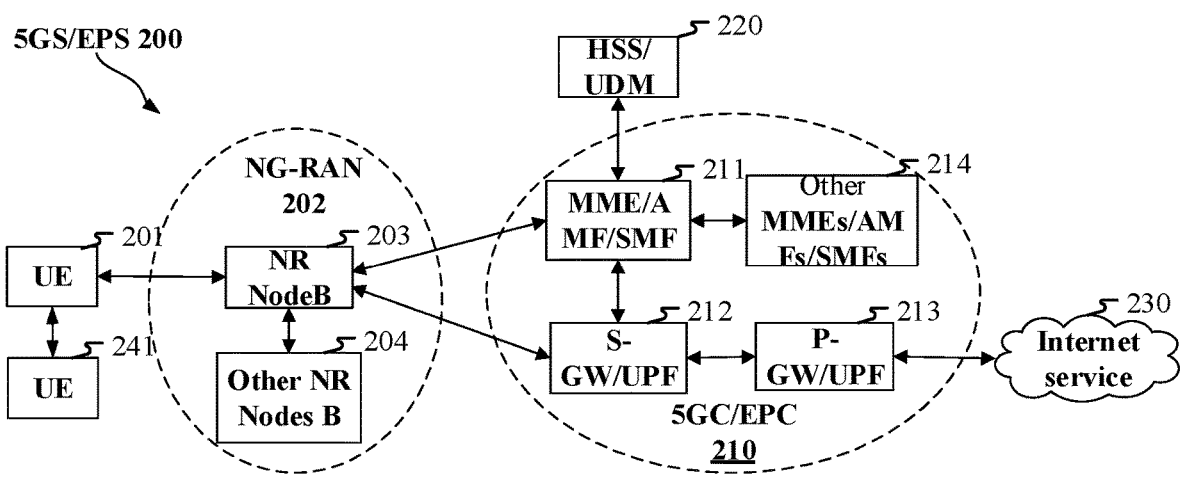
FIG. 2 illustrates a schematic diagram of a network architecture according to one embodiment of the present application.

Embodiment 2 illustrates a schematic diagram of a network architecture according to one embodiment of the present application, as shown in FIG. 2.

FIG. 2 is a diagram illustrating a network architecture 200 of Long-Term Evolution (LTE), Long-Term Evolution Advanced (LTE-A) and future 5G systems. The network architecture 200 LTE, LTE-A and future 5G systems may be called an Evolved Packet System (EPS) 200. The 5G NR or LTE network architecture 200 may be called a 5G System/ Evolved Packet System (5GS/EPS) 200 or other suitable terminology. The 5GS/EPS 200 may comprise one or more UEs 201, a UE 241 in sidelink communication with UE(s)

201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services. The NG-RAN 202 comprises a New Radio (NR) node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching (PS) services.

In one embodiment, the first node in the present application includes the UE 201.

In one embodiment, the first node in the present application includes the UE 241.

In one embodiment, the second node in the present application includes the gNB 203.

Embodiment 3

Figure 3:
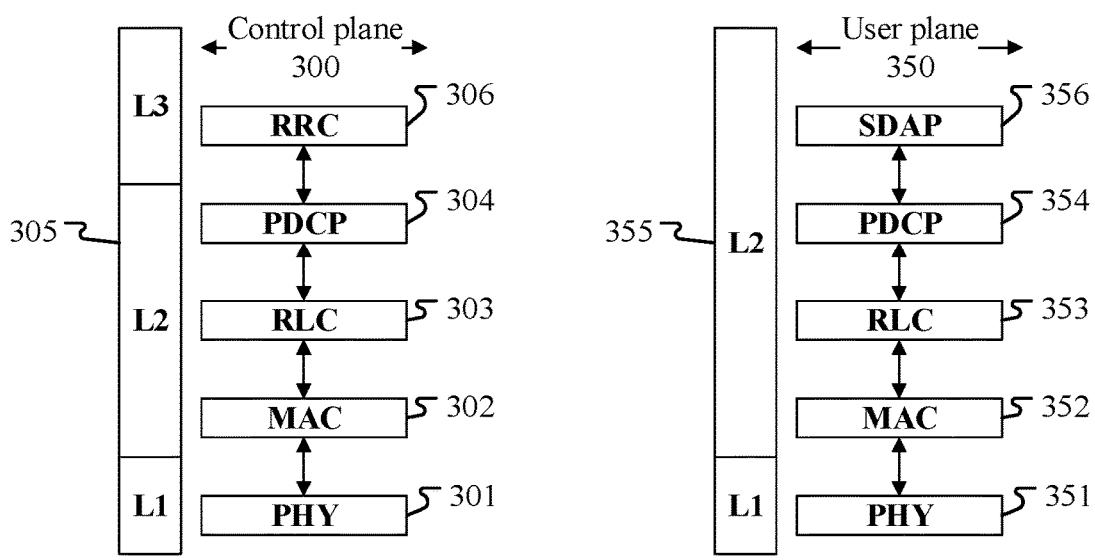
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to the present application, as shown in FIG. 3.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, i.e., layer 1, layer 2 and layer 3. The layer 1 (L1) is the lowest layer which performs signal processing functions of various PHY layers. The L1 is called PHY 301 in the present application. The layer 2 (L2) 305 is above the PHY 301, and is in charge of the link between a first communication node and a second communication node as well as between two UEs. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second communication nodes. The PDCP sublayer 304 provides multiplexing among variable radio bearers and logical channels. The PDCP sublayer 304 provides security by encrypting packets and also support for inter-cell handover of the first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first signaling is generated by the PHY 301, or the PHY 351.

In one embodiment, the first signaling is generated by the RRC sublayer 306.

In one embodiment, the second signaling is generated by the PHY 301, or the PHY 351.

In one embodiment, the second signaling is generated by the RRC sublayer 306.

In one embodiment, the third signaling is generated by the PHY 301, or the PHY 351.

In one embodiment, the third signaling is generated by the RRC sublayer 306.

In one embodiment, the first signal is generated by the PHY 301, or the PHY 351.

In one embodiment, the second signal is generated by the PHY 301, or the PHY 351.

In one embodiment, the first DMRS is generated by the PHY 301, or the PHY 351.

In one embodiment, the second DMRS is generated by the PHY 301, or the PHY 351.

In one embodiment, the first reference signal is generated by the PHY 301, or the PHY 351.

In one embodiment, the second reference signal is generated by the PHY 301, or the PHY 351.

Embodiment 4

Figure 4:
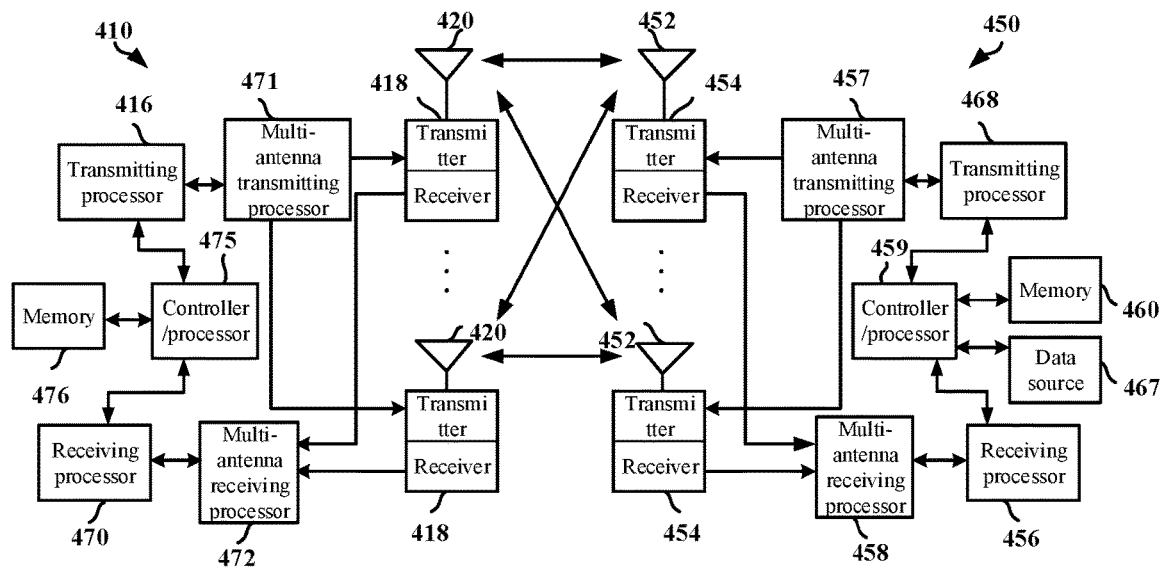
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In DL, the controller/processor 475 provides header compression, encryption, packet segmentation and reordering, multiplexing between a logical channel and a transport channel and radio resource allocation of the second communication device 450 based on various priorities. The controller/processor 475 is responsible for HARQ operation, retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the constellation mapping corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more parallel streams. The transmitting processor 416 then maps each parallel stream into a subcarrier. The modulated symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In DL transmission, the controller/processor 459 provides de-multiplexing between a transport channel and a logical channel, packet reassembling, decryption, header decompression, control signal processing so as to recover a higher-layer packet from the core network. The higher-layer packet is later provided to all protocol layers above the L2 layer. Or various control signals can be provided to the L3 for processing. The controller/processor 459 is also in charge of using ACK and/or NACK protocols for error detection as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL, the controller/processor 459 performs header compression, encryption, packet segmentation and reordering, and multiplexing between a logical channel and a transport channel based on radio resource allocation for the first communication device 410 so as to provide the L2 layer functions used for the user plane and the control plane. The controller/processor 459 is responsible for HARQ operation, retransmission of a lost packet and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated parallel streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with a memory 476 that stores program code and data. The memory 476 can be called a computer readable medium. The controller/processor 475 provides demultiplexing between a transport channel and a logical channel, packet reassembling, decryption, header decompression and control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least transmits a first reference signal and a second reference signal respectively in a first time-domain resource block and a second time-domain resource block; herein, the first node maintains power consistency and phase continuity among multiple first-type signals belonging to a reference time window in time domain; a duration of the reference time window is not larger than a first threshold; the first time-domain resource block and the second time-domain resource block are orthogonal, at least one of the first time-domain resource block or the second time-domain resource block belonging to the reference time window; the first reference signal and the second reference signal respectively belong to different transmission occasions; whether the first node maintains power consistency and phase continuity between the first reference signal and the second reference signal is related to whether a first condition set is being satisfied; when and only when the first condition set is satisfied, the first node maintains the power consistency and phase continuity between the first reference signal and the second reference signal; the first condition set comprises a first condition; the first condition comprises: the first reference signal and the second reference signal being identified by a same index, and, the first time-domain resource block and the second time-domain resource block both belonging to the reference time window.

In one embodiment, the second communication device 450 comprises a memory that stores a computer readable instruction program. The computer readable instruction program generates an action when executed by at least one processor. The action includes: transmitting a first reference signal and a second reference signal respectively in a first time-domain resource block and a second time-domain resource block; herein, the first node maintains power consistency and phase continuity among multiple first-type signals belonging to a reference time window in time domain; a duration of the reference time window is not larger than a first threshold; the first time-domain resource block and the second time-domain resource block are orthogonal, at least one of the first time-domain resource block or the second time-domain resource block belonging to the reference time window; the first reference signal and the second reference signal respectively belong to different transmission occasions; whether the first node maintains power consistency and phase continuity between the first reference signal and the second reference signal is related to whether a first condition set is being satisfied; when and only when the first condition set is satisfied, the first node maintains the power consistency and phase continuity between the first reference signal and the second reference signal; the first condition set comprises a first condition; the first condition comprises: the first reference signal and the second reference signal being identified by a same index, and, the first time-domain resource block and the second time-domain resource block both belonging to the reference time window.

In one embodiment, the first communication device 410 comprises at least one processor and at least one memory. The at least one memory comprises computer program codes; the at least one memory and the computer program codes are configured to be used in collaboration with the at least one processor. The first communication device 410 at least receives a first reference signal and a second reference signal respectively in a first time-domain resource block and a second time-domain resource block; herein, a transmitter of the first reference signal and the second reference signal maintains power consistency and phase continuity among multiple first-type signals belonging to a reference time window in time domain; a duration of the reference time window is not larger than a first threshold; the first time-domain resource block and the second time-domain resource block are orthogonal, at least one of the first time-domain resource block or the second time-domain resource block belonging to the reference time window; the first reference signal and the second reference signal respectively belong to different transmission occasions; whether the transmitter of the first reference signal and the second reference signal maintains power consistency and phase continuity between the first reference signal and the second reference signal depends on whether a first condition set is being satisfied; when and only when the first condition set is satisfied, the transmitter of the first reference signal and the second reference signal maintains the power consistency and phase continuity between the first reference signal and the second reference signal; the first condition set comprises a first condition; the first condition comprises: the first reference signal and the second reference signal being identified by a same index, and, the first time-domain resource block and the second time-domain resource block both belonging to the reference time window.

In one embodiment, the first communication device 410 comprises a memory that stores a computer readable instruction program. The computer readable instruction program generates an action when executed by at least one processor. The action includes: receiving a first reference signal and a second reference signal respectively in a first time-domain resource block and a second time-domain resource block; herein, a transmitter of the first reference signal and the second reference signal maintains power consistency and phase continuity among multiple first-type signals belonging to a reference time window in time domain; a duration of the reference time window is not larger than a first threshold; the first time-domain resource block and the second time-domain resource block are orthogonal, at least one of the first time-domain resource block or the second time-domain resource block belonging to the reference time window; the first reference signal and the second reference signal respectively belong to different transmission occasions; whether the transmitter of the first reference signal and the second reference signal maintains power consistency and phase continuity between the first reference signal and the second reference signal depends on whether a first condition set is being satisfied; when and only when the first condition set is satisfied, the transmitter of the first reference signal and the second reference signal maintains the power consistency and phase continuity between the first reference signal and the second reference signal; the first condition set comprises a first condition; the first condition comprises: the first reference signal and the second reference signal being identified by a same index, and, the first time-domain resource block and the second time-domain resource block both belonging to the reference time window.

In one embodiment, the first node in the present application comprises the second communication device 450.

In one embodiment, the second node in the present application comprises the first communication device 410.

In one embodiment, at least one of the antenna 452, the receiver 454, the receiving processor 456, the multi-antenna receiving processor 458, the controller/processor 459, the memory 460 or the data source 467 is used to receive the first signaling in the present application; at least one of the antenna 420, the transmitter 418, the transmitting processor 416, the multi-antenna transmitting processor 471, the controller/processor 475 or the memory 476 is used to transmit the first signaling in the present application.

In one embodiment, at least one of the antenna 452, the receiver 454, the receiving processor 456, the multi-antenna receiving processor 458, the controller/processor 459, the memory 460 or the data source 467 is used to receive the second signaling in the present application; at least one of the antenna 420, the transmitter 418, the transmitting processor 416, the multi-antenna transmitting processor 471, the controller/processor 475 or the memory 476 is used to transmit the second signaling in the present application.

In one embodiment, at least one of the antenna 452, the receiver 454, the receiving processor 456, the multi-antenna receiving processor 458, the controller/processor 459, the memory 460 or the data source 467 is used to receive the third signaling in the present application; at least one of the antenna 420, the transmitter 418, the transmitting processor 416, the multi-antenna transmitting processor 471, the controller/processor 475 or the memory 476 is used to transmit the third signaling in the present application.

In one embodiment, at least one of the antenna 452, the transmitter 454, the transmitting processor 468, the multi-antenna transmitting processor 457, the controller/processor 459, or the memory 460 is used to transmit the first reference signal and the second reference signal respectively in the first time-domain resource block and the second time-domain resource block in the present application; at least one of the antenna 420, the receiver 418, the receiving processor 470, the multi-antenna receiving processor 472, the controller/processor 475 or the memory 476 is used to receive the first reference signal and the second reference signal respectively in the first time-domain resource block and the second time-domain resource block in the present application.

In one embodiment, at least one of the antenna 452, the transmitter 454, the transmitting processor 468, the multi-antenna transmitting processor 457, the controller/processor 459, or the memory 460 is used to transmit the first signal and the second signal respectively in the third time-domain resource block and the fourth time-domain resource block in the present application; at least one of the antenna 420, the receiver 418, the receiving processor 470, the multi-antenna receiving processor 472, the controller/processor 475 or the memory 476 is used to receive the first signal and the second signal respectively in the third time-domain resource block and the fourth time-domain resource block in the present application.

In one embodiment, at least one of the antenna 452, the transmitter 454, the transmitting processor 468, the multi-antenna transmitting processor 457, the controller/processor 459, or the memory 460 is used to transmit the first DMRS and the second DMRS respectively in the third time-domain resource block and the fourth time-domain resource block in the present application; at least one of the antenna 420, the receiver 418, the receiving processor 470, the multi-antenna receiving processor 472, the controller/processor 475 or the memory 476 is used to receive the first DMRS and the second DMRS respectively in the third time-domain resource block and the fourth time-domain resource block in the present application.

Embodiment 5

Figure 5:
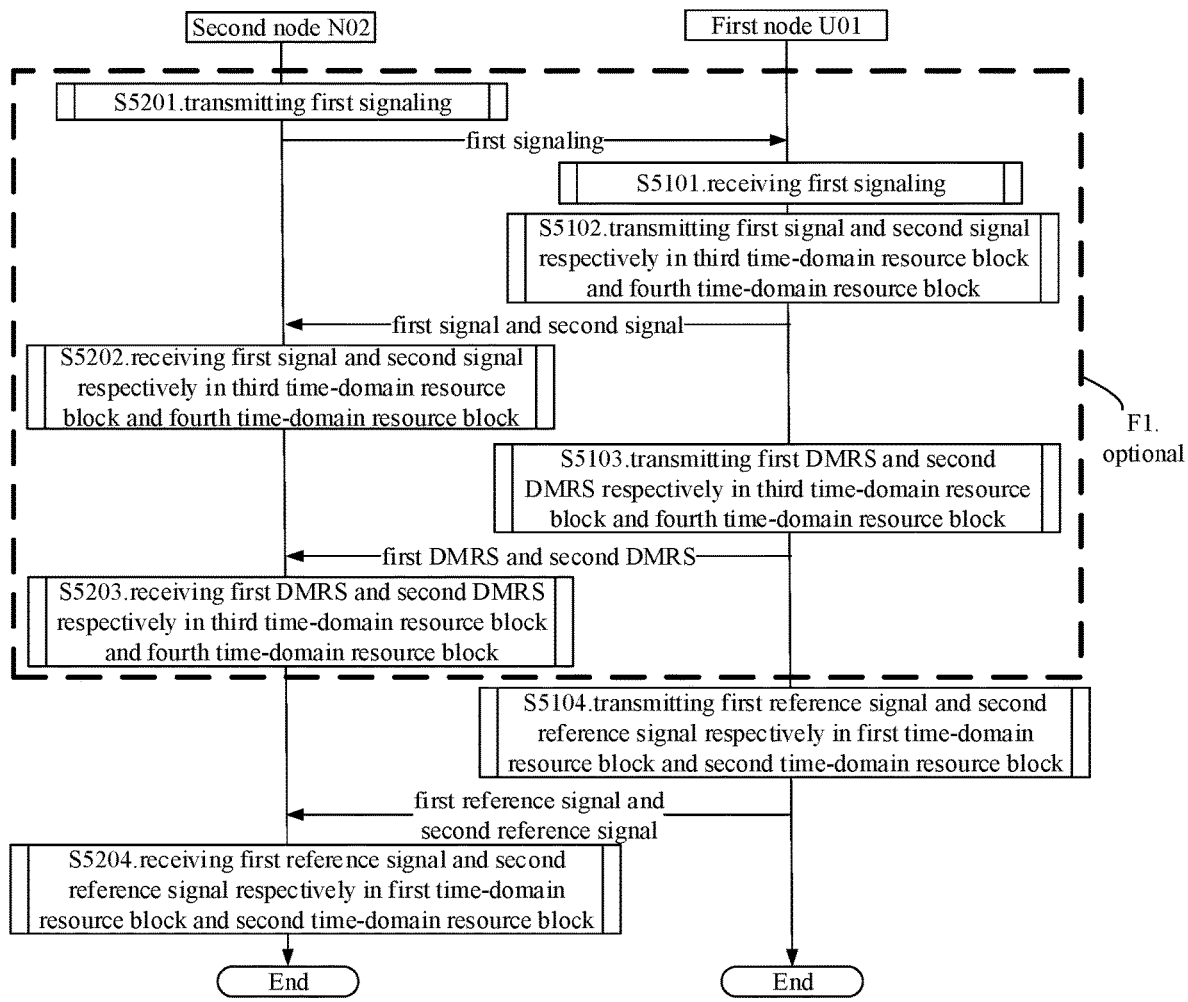
FIG. 5 illustrates a flowchart of transmission according to one embodiment of the present application.

Embodiment 5 illustrates a flowchart of wireless transmission according to one embodiment of the present application, as shown in FIG. 5. In FIG. 5, a first node U01 and a second node N02 are two communication nodes in communications via an air interface; herein, steps in the box F1 are optional.

The first node U01 receives a first signaling in step S5101; transmits a first signal and a second signal respectively in a third time-domain resource block and a fourth time-domain resource block in step S5102; transmits a first DMRS and a second DMRS respectively in a third time-domain resource block and a fourth time-domain resource block in step S5103; and transmits a first reference signal and a second reference signal respectively in a first time-domain resource block and a second time-domain resource block in step S5104;

The second node N02 transmits a first signaling in step S5201; receives a first signal and a second signal respectively in a third time-domain resource block and a fourth time-domain resource block in step S5202; receives a first DMRS and a second DMRS respectively in a third time-domain resource block and a fourth time-domain resource block in step S5203; and receives a first reference signal and a second reference signal respectively in a first time-domain resource block and a second time-domain resource block in step S5204.

In Embodiment 5, the first node maintains power consistency and phase continuity among multiple first-type signals belonging to a reference time window in time domain; a duration of the reference time window is not larger than a first threshold; the first time-domain resource block and the second time-domain resource block are orthogonal, at least one of the first time-domain resource block or the second time-domain resource block belonging to the reference time window; the first reference signal and the second reference signal respectively belong to different transmission occasions; whether the first node maintains power consistency and phase continuity between the first reference signal and the second reference signal is related to whether a first condition set is being satisfied; when and only when the first condition set is satisfied, the first node maintains the power consistency and phase continuity between the first reference signal and the second reference signal; the first condition set comprises a first condition; the first condition comprises: the first reference signal and the second reference signal being identified by a same index, and, the first time-domain resource block and the second time-domain resource block both belonging to the reference time window. The first signaling is used to indicate the third time-domain resource block and the fourth time-domain resource block, the third time-domain resource block and the fourth time-domain resource block being orthogonal, the third time-domain resource block and the fourth time-domain resource block both belong to the reference time window, each of the first signal and the second signal a first-type signal, the first node maintains power consistency and phase continuity between the first signal and the second signal; each of the first reference signal and the second reference signal is a first-type reference signal, where the first-type signals are different from the first-type reference signals. A same DMRS is used for demodulating the first signal and the second signal, the same DMRS including the first DMRS and the second DMRS.

In one embodiment, transmitting the first reference signal is later than transmitting the first signaling.

In one embodiment, transmitting the first reference signal is no later than transmitting the first signaling.

In one embodiment, transmitting the second reference signal is later than transmitting the first signaling.

In one embodiment, transmitting the second reference signal is no later than transmitting the first signaling.

In one embodiment, the phrase of "the power consistency between the first reference signal and the second reference signal" means that both a power of the first reference signal and a power of the second reference signal are related to a power of a said first-type signal in the reference time window.

In one embodiment, the phrase of "the power consistency between the first reference signal and the second reference signal" means that both a power of the first reference signal and a power of the second reference signal are related to a power of the first signal.

In one embodiment, the phrase that "a power of the first reference signal and a power of the second reference signal are both related to a power of a given signal" means that both a power of the first reference signal and a power of the second reference signal are consistent with a power of the given signal.

In one embodiment, the phrase that "a power of the first reference signal and a power of the second reference signal are both related to a power of a given signal" means that both a power of the first reference signal and a power of the second reference signal are the same as a power of the given signal.

In one embodiment, the phrase that "a power of the first reference signal and a power of the second reference signal are both related to a power of a given signal" means that a power of the given signal is used to determine a power of the first reference signal and a power of the second reference signal.

In one embodiment, the phrase that "a power of the first reference signal and a power of the second reference signal are both related to a power of a given signal" means that a power of the first reference signal follows a power of the given signal, a power of the second reference signal being the same as the power of the first reference signal.

In one embodiment, the phrase that "a power of the first reference signal follows a power of the given signal" comprises a meaning that the power of the first reference signal is not updated.

In one embodiment, the phrase that "a power of the first reference signal follows a power of the given signal" comprises a meaning that the power of the first reference signal is not further updated on the power of the given signal.

In one embodiment, the phrase that "a power of the first reference signal follows a power of the given signal" comprises a meaning that the power of the first reference signal is consistent with the power of the given signal.

In one embodiment, the phrase that "a power of the first reference signal follows a power of the given signal" comprises a meaning that the power of the first reference signal is the same as the power of the given signal.

In one embodiment, the phrase that "a power of the first reference signal follows a power of the given signal" comprises a meaning that the power of the first reference signal is kept the same as the power of the given signal.

In one embodiment, the phrase that "a power of the first reference signal follows a power of the given signal" comprises a meaning that the power of the first reference signal is set to the power of the given signal.

In one embodiment, the phrase that "a power of the first reference signal follows a power of the given signal" comprises a meaning that the power of the first reference signal is the same as the power of the given signal, the power of the first reference signal being unrelated to a first parameter.

In one embodiment, the phrase that "a power of the first reference signal follows a power of the given signal" comprises a meaning that the power of the first reference signal is the same as the power of the given signal, the power of the first reference signal being unrelated to a first power.

In one embodiment, the phrase that "a power of the first reference signal follows a power of the given signal" comprises a meaning that the power of the first reference signal is the same as the power of the given signal, a second signaling is used for indicating the first time-domain resource block, the power of the first reference signal being unrelated to the second signaling.

In one embodiment, the phrase that "a power of the first reference signal follows a power of the given signal" comprises a meaning that the power of the first reference signal is the same as the power of the given signal, a second signaling is used for indicating the first reference signal, the power of the first reference signal being unrelated to the second signaling.

In one embodiment, the given signal is the first signal in the present application.

In one embodiment, the given signal is a said first-type signal in the reference time window in the present application.

In one embodiment, when the first condition set is unsatisfied, the first node does not maintain power consistency and phase continuity between the first reference signal and the second reference signal.

In one embodiment, the phrase that "the first node maintains power consistency and phase continuity among multiple first-type signals belonging to a reference time window in time domain" means that the first node does not maintain power consistency and phase continuity between two first-type signals respectively being within and outside a reference time window in time domain.

In one embodiment, the phrase "power" refers to a transmit power.

In one embodiment, the phrase "power consistency" refers to power consistency.

In one embodiment, the phrase "power consistency" refers to having consistent power.

In one embodiment, the phrase "power consistency" refers to a same power.

In one embodiment, the phrase "power consistency" refers to transmit powers being the same.

In one embodiment, the phrase "phase continuity" refers to phase continuity.

In one embodiment, the phrase "phase continuity" refers to having continuous phase.

In one embodiment, the phrase "phase continuity" refers to the phase being continuous in an order from earlier to later time.

In one embodiment, the phrase "phase continuity" refers to the phase being continuous in an order from later to earlier time.

In one embodiment, the phrase "phase continuity" means that the phase changes with time continuously.

In one embodiment, the phrase that "the first node maintains power consistency and phase continuity among multiple signals" means that a target receiver of the multiple signals performs combined channel estimation on the multiple signals.

In one embodiment, the phrase that "the first node maintains power consistency and phase continuity among multiple signals" means that the first node is expected to maintain power consistency and phase continuity among multiple signals.

In one embodiment, the phrase that "the first node maintains power consistency and phase continuity among multiple signals" means that the first node assumes maintaining power consistency and phase continuity among multiple signals.

In one embodiment, the phrase that "the first node maintains power consistency and phase continuity among multiple signals" means that a target receiver of the multiple signals receives the multiple signals under a first assumption.

In one embodiment, the phrase that "the first node maintains power consistency and phase continuity among multiple signals" means that a target receiver of the multiple signals performs combined channel estimation on the multiple signals.

In one embodiment, the phrase that "the first node is expected to maintain power consistency and phase continuity among multiple signals" means that the first node actually maintains power consistency and phase continuity among multiple signals.

In one embodiment, the phrase that "the first node is expected to maintain power consistency and phase continuity among multiple signals" means that the first node itself determines whether it actually maintains power consistency and phase continuity among multiple signals.

In one embodiment, the phrase that "the first node is expected to maintain power consistency and phase continuity among multiple signals" means that power consistency and phase continuity are maintained among multiple signals.

In one embodiment, the phrase that "the first node is expected to maintain power consistency and phase continuity among multiple signals" means that the first node itself determines whether power consistency and phase continuity are maintained among multiple signals.

In one embodiment, the phrase that "the first node is expected to maintain power consistency and phase continuity among multiple signals" means that a target receiver of the multiple signals receives multiple signals under a first assumption.

In one embodiment, the phrase that "the first node assumes maintaining power consistency and phase continuity among multiple signals" means that the first node actually maintains power consistency and phase continuity among multiple signals.

In one embodiment, the phrase that "the first node assumes maintaining power consistency and phase continuity among multiple signals" means that the first node itself determines whether it actually maintains power consistency and phase continuity among multiple signals.

In one embodiment, the phrase that "the first node assumes maintaining power consistency and phase continuity among multiple signals" means that power consistency and phase continuity are maintained among multiple signals.

In one embodiment, the phrase that "the first node assumes maintaining power consistency and phase continuity among multiple signals" means that the first node itself determines whether power consistency and phase continuity are maintained among multiple signals.

In one embodiment, the phrase that "the first node assumes maintaining power consistency and phase continuity among multiple signals" means that a target receiver of the multiple signals receives the multiple signals under a first assumption.

In one embodiment, the first assumption comprises that the first node maintains power consistency and phase continuity among multiple signals.

In one embodiment, the first assumption comprises that power consistency and phase continuity are maintained among multiple signals.

In one embodiment, the first assumption comprises that multiple signals have power consistency and phase continuity.

In one embodiment, the phrase that "the first node does not maintain power consistency and phase continuity among multiple signals" means that the first node is not expected to maintain power consistency and phase continuity among multiple signals.

In one embodiment, the phrase that "the first node does not maintain power consistency and phase continuity among multiple signals" means that the first node does not assume maintaining power consistency and phase continuity among multiple signals.

In one embodiment, the phrase that "the first node does not maintain power consistency and phase continuity among multiple signals" means that a target receiver of the multiple signals performs no combined channel estimation on the multiple signals.

In one embodiment, the phrase that "the first node does not maintain power consistency and phase continuity among multiple signals" means that a target receiver of the multiple signals receives multiple signals under a second assumption.

In one embodiment, the phrase that "the first node is not expected to maintain power consistency and phase continuity among multiple signals" means that the first node actually does not maintain power consistency and phase continuity among multiple signals.

In one embodiment, the phrase that "the first node is not expected to maintain power consistency and phase continuity among multiple signals" means that the first node itself determines whether it actually maintains no power consistency and no phase continuity among multiple signals.

In one embodiment, the phrase that "the first node is not expected to maintain power consistency and phase continuity among multiple signals" means that power consistency and phase continuity are not maintained among multiple signals.

In one embodiment, the phrase that "the first node is not expected to maintain power consistency and phase continuity among multiple signals" means that the first node itself determines whether it maintains no power consistency and no phase continuity among multiple signals.

In one embodiment, the phrase that "the first node is not expected to maintain power consistency and phase continuity among multiple signals" means that a target receiver of the multiple signals receives multiple signals under a second assumption.

In one embodiment, the phrase that "the first node does not assume maintaining power consistency and phase continuity among multiple signals" means that the first node actually maintains no power consistency and no phase continuity among multiple signals.

In one embodiment, the phrase that "the first node does not assume maintaining power consistency and phase continuity among multiple signals" means that the first node itself determines whether it actually maintains no power consistency and no phase continuity among multiple signals.

In one embodiment, the phrase that "the first node does not assume maintaining power consistency and phase continuity among multiple signals" means that power consistency and phase continuity are not maintained among multiple signals.

In one embodiment, the phrase that "the first node does not assume maintaining power consistency and phase continuity among multiple signals" means that the first node itself determines whether it maintains no power consistency and no phase continuity among multiple signals.

In one embodiment, the phrase that "the first node does not assume maintaining power consistency and phase continuity among multiple signals" means that a target receiver of the multiple signals receives multiple signals under a second assumption.

In one embodiment, the second assumption comprises that the first node does not maintain power consistency and phase continuity among multiple signals.

In one embodiment, the second assumption comprises that power consistency and phase continuity are not maintained among multiple signals.

In one embodiment, the multiple signals are multiple first-type signals that belong to a reference time window in time domain in the present application.

In one embodiment, the multiple signals are the first signal and the second signal in the present application.

In one embodiment, the multiple signals are the first reference signal and the second reference signal in the present application.

In one embodiment, the multiple signals are two first-type signals that are respectively within and outside a reference time window in time domain in the present application.

Embodiment 6

Figure 6:
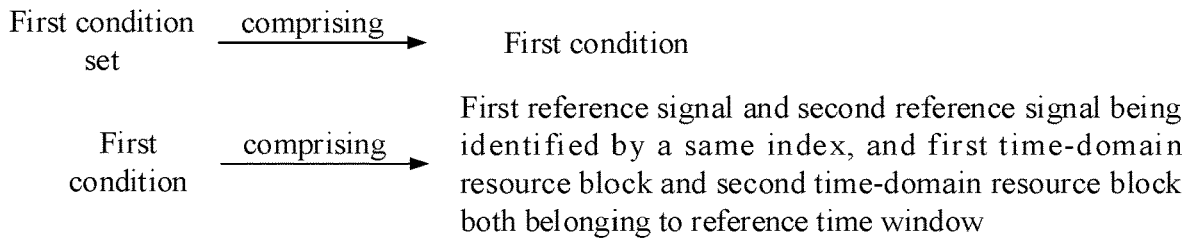
FIG. 6 illustrates a schematic diagram of a first condition set according to one embodiment of the present application.

Embodiment 6 illustrates a schematic diagram of a first condition set according to one embodiment of the present application; as shown in FIG. 6.

In Embodiment 6, the first condition set comprises a first condition; the first condition comprises: the first reference signal and the second reference signal being identified by a same index, and the first time-domain resource block and the second time-domain resource block both belonging to the reference time window.

In one embodiment, when the first reference signal and the second reference signal are identified by different indexes or either of the first time-domain resource block and the second time-domain resource block does not belong to the reference time window, the first condition set is not satisfied.

In one embodiment, the first condition set only comprises the first condition.

In one embodiment, the first condition set comprises at least one condition, the first condition being a condition in the first condition set.

In one embodiment, the first condition set comprises more than one condition, the first condition being a condition in the first condition set.

In one embodiment, when each condition in the first condition set is being satisfied, the first condition set is satisfied.

In one embodiment, when each condition in the first condition set is being satisfied, the first condition set is satisfied; when there is one condition in the first condition set being unsatisfied, the first condition set is not satisfied.

In one embodiment, when one condition in the first condition set is being satisfied, the first condition set is satisfied; when none of conditions in the first condition set is being satisfied, the first condition set is not satisfied.

In one embodiment, the first condition set comprises more than one condition, with the first condition being a condition in the first condition set; when each condition in the first condition set is satisfied, the first condition set is satisfied; the first condition set also comprises a third condition, the third condition being a condition in the first condition set.

In one subembodiment, the third condition comprises that both the first reference signal and the second reference signal are periodic reference signals.

In one subembodiment, the third condition comprises that both the first reference signal and the second reference signal are periodic sounding reference signals.

In one subembodiment, the third condition comprises that both the first reference signal and the second reference signal are semi-persistent sounding reference signals.

In one subembodiment, the third condition comprises that both the first reference signal and the second reference signal are aperiodic sounding reference signals.

In one embodiment, the first condition set comprises more than one condition, with the first condition being a condition in the first condition set; when each condition in the first condition set is satisfied, the first condition set is satisfied;

the first condition set also comprises a fourth condition, the fourth condition being a condition in the first condition set.

In one subembodiment, the fourth condition comprises that the first reference signal and the second reference signal are indicated by a same signaling.

In one subembodiment, the fourth condition comprises that the first reference signal and the second reference signal are indicated by different signalings.

In one embodiment, the first condition set comprises more than one condition, with the first condition being a condition in the first condition set; when each condition in the first condition set is satisfied, the first condition set is satisfied; the first condition set also comprises a fifth condition, the fifth condition being a condition in the first condition set; the fifth condition comprises a spatial relation of the first reference signal and a spatial relation of the second reference signal being the same.

In one embodiment, the spatial relation comprises a Transmission configuration Indication (TCI) state.

In one embodiment, the spatial relation comprises a QCL parameter.

In one embodiment, the spatial relation comprises a QCL relation.

In one embodiment, the spatial relation comprises a QCL assumption.

In one embodiment, the spatial relation comprises a spatial domain filter.

In one embodiment, the spatial domain filter comprises a spatial domain transmission filter.

In one embodiment, the spatial domain filter comprises a spatial domain reception filter.

In one embodiment, the spatial relation comprises a Spatial Tx parameter.

In one embodiment, the spatial relation comprises a Spatial Rx parameter.

In one embodiment, the spatial relation comprises transmission antenna port(s).

In one embodiment, the spatial relation comprises precoding.

In one embodiment, the spatial relation comprises large-scale properties.

In one embodiment, the Spatial Tx parameters comprise one or more of a transmission antenna port, a transmission antenna port group, a transmitting beam, a transmission analog beamforming matrix, a transmission analog beamforming vector, a transmission beamforming matrix, a transmission beamforming vector or a transmission spatial filtering.

In one embodiment, the Spatial Rx parameters comprise one or more of a receiving beam, a reception analog beamforming matrix, a reception analog beamforming vector, a reception beamforming matrix, a reception beamforming vector or a reception spatial filtering.

In one embodiment, the large-scale properties include one or more of delay spread, Doppler spread, Doppler shift, average delay or Spatial Rx parameter.

In one embodiment, the QCL refers to being Quasi-Co-Located.

In one embodiment, the QCL refers to Quasi-Co-Location.

In one embodiment, the QCL parameters include one or more of a delay spread, a Doppler spread, a Doppler shift, an average delay or a Spatial Rx parameter.

In one embodiment, the QCL parameters include a Doppler shift and a Doppler spread.

In one embodiment, the QCL parameters include a Doppler shift and an average delay.

In one embodiment, the QCL parameters include a Spatial Rx parameter.

In one embodiment, the QCL parameters of a QCL type being QCL-TypeA include a Doppler shift, a Doppler spread, an average delay and a delay spread.

In one embodiment, the QCL parameters of a QCL type being QCL-TypeB include a Doppler shift and a Doppler spread.

In one embodiment, the QCL parameters of a QCL type being QCL-TypeC include a Doppler shift and an average delay.

In one embodiment, the QCL parameters of a QCL type being QCL-TypeD include a Spatial Rx parameter.

In one embodiment, the QCL type includes QCL-TypeA, QCL-TypeB, QCL-TypeC and QCL-TypeD.

In one embodiment, for the specific definition of the QCL-TypeA, the QCL-TypeB, the QCL-TypeC and the QCL-TypeD, refer to 3GPP TS38.214, Chapter 5.1.5.

In one embodiment, a TCI state at least XXX a reference signal corresponding to one QCL type.

In one embodiment, the specific definition of the TCI state can be found in 3GPP TS38.214, Chapter 5.1.5.

Embodiment 7

Figure 7:
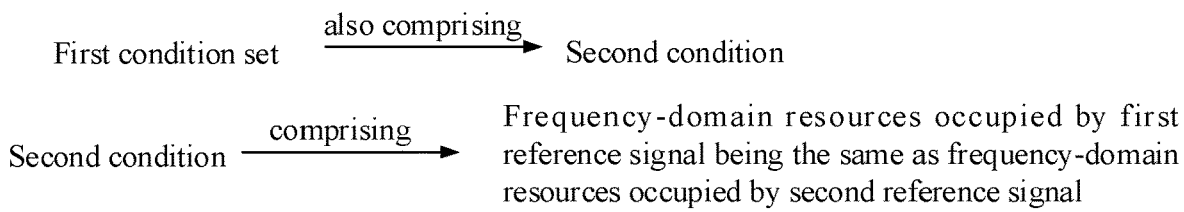
FIG. 7 illustrates a schematic diagram of a first condition set according to another embodiment of the present application.

Embodiment 7 illustrates a schematic diagram of a first condition set according to another embodiment of the present application; as shown in FIG. 7.

In Embodiment 7, the first condition set comprises more than one condition, with the first condition being a condition in the first condition set; when each condition in the first condition set is satisfied, the first condition set is satisfied; the first condition set also comprises a second condition, the second condition being a condition in the first condition set; the second condition comprises frequency-domain resources occupied by the first reference signal and frequency-domain resources occupied by the second reference signal being the same.

In one embodiment, the phrase of "frequency-domain resources occupied" refers to Resource Blocks (RBs) being occupied.

In one embodiment, the phrase of "frequency-domain resources occupied" refers to subcarriers being occupied.

Embodiment 8

Figure 8:
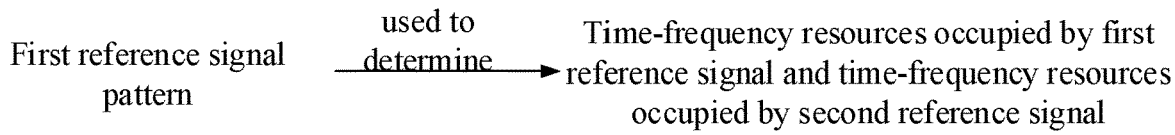
FIG. 8 illustrates a schematic diagram of a first reference signal pattern and a second reference signal pattern according to one embodiment of the present application.
Figure 8:
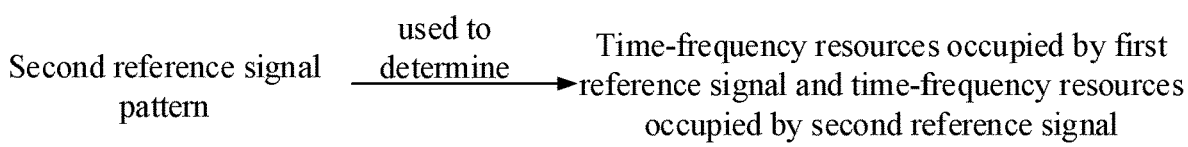

Embodiment 8 illustrates a schematic diagram of a first reference signal pattern and a second reference signal pattern according to one embodiment of the present application, as shown in FIG. 8.

In Embodiment 8, time-frequency resources occupied by the first reference signal and time-frequency resources occupied by the second reference signal are related to whether the first condition set is being satisfied; when the first condition set is satisfied, a first reference signal pattern is used to determine the time-frequency resources occupied by the first reference signal and the time-frequency resources occupied by the second reference signal; when the first condition set is not being satisfied, a second reference signal pattern is used to determine the time-frequency resources occupied by the first reference signal and the time-frequency resources occupied by the second reference signal; the first reference signal pattern is different from the second reference signal pattern.

In one embodiment, the phrase of "time-frequency resources occupied" refers to Resource Elements (REs) being occupied.

In one embodiment, the phrase of "time-frequency resources occupied" refers to time-domain resources being occupied and frequency-domain resources being occupied.

In one embodiment, the phrase that "the first reference signal pattern is different from the second reference signal pattern" comprises a meaning that a frequency-domain density of the first reference signal pattern is different from that of the second reference signal pattern.

In one embodiment, the phrase that "the first reference signal pattern is different from the second reference signal pattern" comprises a meaning that a frequency-domain density of the first reference signal pattern is no larger than that of the second reference signal pattern.

In one embodiment, the phrase that "the first reference signal pattern is different from the second reference signal pattern" comprises a meaning that a frequency-domain density of the first reference signal pattern is smaller than that of the second reference signal pattern.

In one embodiment, a second signaling is used for indicating the second reference signal pattern.

In one embodiment, a second signaling is used for indicating only the second reference signal pattern of the second reference signal pattern and the first reference signal pattern.

In one embodiment, the first reference signal pattern is default.

In one embodiment, the first reference signal pattern is configured by a higher layer signaling.

In one embodiment, the second reference signal pattern is configured by a higher layer signaling.

In one embodiment, the second reference signal pattern is related to the first reference signal pattern.

In one embodiment, the second reference signal pattern is used to determine the first reference signal pattern.

In one embodiment, the first reference signal pattern comprises a number of symbols occupied in a reference time-frequency resource block, while the second reference signal pattern comprises a number of symbols occupied in the reference time-frequency resource block.

In one embodiment, the first reference signal pattern comprises symbols occupied in a reference time-frequency resource block, while the second reference signal pattern comprises symbols occupied in the reference time-frequency resource block.

In one embodiment, the first reference signal pattern comprises subcarriers occupied in a reference time-frequency resource block, while the second reference signal pattern comprises subcarriers occupied in the reference time-frequency resource block.

In one embodiment, the first reference signal pattern comprises Resource Elements (REs) occupied in a reference time-frequency resource block, while the second reference signal pattern comprises REs occupied in the reference time-frequency resource block.

In one embodiment, the reference time-frequency resource block comprises at least one Resource Block (RB) in frequency domain.

In one embodiment, the reference time-frequency resource block comprises one RB in frequency domain.

In one embodiment, the reference time-frequency resource block comprises multiple consecutive RBs in frequency domain.

In one embodiment, the reference time-frequency resource block comprises one RB or multiple consecutive RBs in frequency domain.

In one embodiment, the reference time-frequency resource block comprises at least one symbol in time domain.

In one embodiment, the reference time-frequency resource block comprises multiple consecutive symbols in time domain.

In one embodiment, the reference time-frequency resource block comprises one symbol or multiple consecutive symbols in time domain.

In one embodiment, the phrase that "the first reference signal pattern is different from the second reference signal pattern" comprises a meaning that REs occupied by the first reference signal pattern in a reference time-frequency resource block are different from those occupied by the second reference signal pattern in the reference time-frequency resource block.

In one embodiment, the phrase that "the first reference signal pattern is different from the second reference signal pattern" comprises a meaning that REs occupied by the first reference signal pattern in a reference time-frequency resource block are fewer than those occupied by the second reference signal pattern in the reference time-frequency resource block.

In one embodiment, the phrase that "the first reference signal pattern is different from the second reference signal pattern" comprises a meaning that subcarriers occupied by the first reference signal pattern in a reference time-frequency resource block are different from those occupied by the second reference signal pattern in the reference time-frequency resource block.

In one embodiment, the phrase that "the first reference signal pattern is different from the second reference signal pattern" comprises a meaning that subcarriers occupied by the first reference signal pattern in a reference time-frequency resource block are fewer than those occupied by the second reference signal pattern in the reference time-frequency resource block.

In one embodiment, the phrase that "the first reference signal pattern is different from the second reference signal pattern" comprises a meaning that a number of symbols occupied by the first reference signal pattern in a reference time-frequency resource block is different from that occupied by the second reference signal pattern in the reference time-frequency resource block.

In one embodiment, the phrase that "the first reference signal pattern is different from the second reference signal pattern" comprises a meaning that symbols occupied by the first reference signal pattern in a reference time-frequency resource block are different from those occupied by the second reference signal pattern in the reference time-frequency resource block.

In one embodiment, the phrase that "the first reference signal pattern is different from the second reference signal pattern" comprises a meaning that a number of symbols occupied by the first reference signal pattern in a reference time-frequency resource block is less than that occupied by the second reference signal pattern in the reference time-frequency resource block.

In one embodiment, the phrase that "the first reference signal pattern is different from the second reference signal pattern" comprises a meaning that a number of symbols occupied by the first reference signal pattern in a reference time-frequency resource block is greater than that occupied by the second reference signal pattern in the reference time-frequency resource block.

In one embodiment, the phrase that "the first reference signal pattern is different from the second reference signal pattern" comprises a meaning that subcarriers occupied by the first reference signal pattern in a reference time-frequency resource block are different from those occupied by the second reference signal pattern in the reference time-frequency resource block, while a number of symbols occupied by the first reference signal pattern in a reference time-frequency resource block is the same as that occupied by the second reference signal pattern in the reference time-frequency resource block.

In one embodiment, the phrase that "the first reference signal pattern is different from the second reference signal pattern" comprises a meaning that the first reference signal pattern and the second reference signal pattern occupy same subcarriers in a reference time-frequency resource block, while symbols occupied by the first reference signal pattern in a reference time-frequency resource block are different from those occupied by the second reference signal pattern in the reference time-frequency resource block.

In one embodiment, the phrase that "the first reference signal pattern is different from the second reference signal pattern" comprises a meaning that the first reference signal pattern and the second reference signal pattern occupy same subcarriers in a reference time-frequency resource block, while a number of symbols occupied by the first reference signal pattern in a reference time-frequency resource block is less than that occupied by the second reference signal pattern in the reference time-frequency resource block.

In one embodiment, the phrase that "the first reference signal pattern is different from the second reference signal pattern" comprises a meaning that subcarriers occupied by the first reference signal pattern in a reference time-frequency resource block are fewer than those occupied by the second reference signal pattern in the reference time-frequency resource block, while a number of symbols occupied by the first reference signal pattern in a reference time-frequency resource block is the same as that occupied by the second reference signal pattern in the reference time-frequency resource block.

In one embodiment, the phrase that "a given reference signal pattern is used to determine time-frequency resources occupied by a given reference signal" comprises a meaning that a number of symbols occupied by the given reference signal in a reference time-frequency resource block is the same as that occupied in the reference time-frequency resource block comprised by the given reference signal pattern.

In one embodiment, the phrase that "a given reference signal pattern is used to determine time-frequency resources occupied by a given reference signal" comprises a meaning that symbols occupied by the given reference signal in a reference time-frequency resource block are the same as those occupied in the reference time-frequency resource block comprised by the given reference signal pattern.

In one embodiment, the phrase that "a given reference signal pattern is used to determine time-frequency resources occupied by a given reference signal" comprises a meaning that subcarriers occupied by the given reference signal in a reference time-frequency resource block are the same as those occupied in the reference time-frequency resource block comprised by the given reference signal pattern.

In one embodiment, the phrase that "a given reference signal pattern is used to determine time-frequency resources occupied by a given reference signal" comprises a meaning that REs occupied by the given reference signal in a reference time-frequency resource block are the same as those occupied in the reference time-frequency resource block comprised by the given reference signal pattern.

In one embodiment, the given reference signal is the first reference signal, and the given reference signal pattern is the first reference signal pattern.

In one embodiment, the given reference signal is the second reference signal, and the given reference signal pattern is the first reference signal pattern.

In one embodiment, the given reference signal is the first reference signal, and the given reference signal pattern is the second reference signal pattern.

In one embodiment, the given reference signal is the second reference signal, and the given reference signal pattern is the second reference signal pattern.

Embodiment 9

Figure 9:
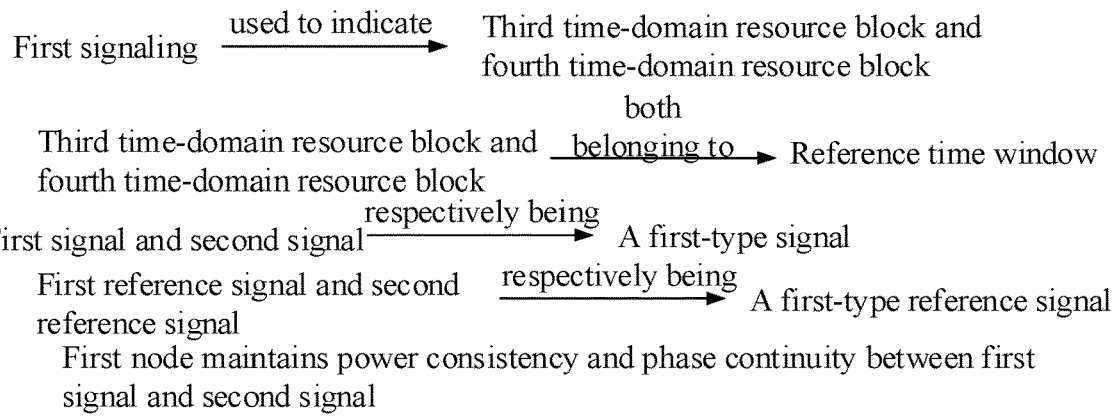
FIG. 9 illustrates a schematic diagram of a first signal and a second signal according to one embodiment of the present application.

Embodiment 9 illustrates a schematic diagram of a first signal and a second signal according to one embodiment of the present application, as shown in FIG. 9.

In Embodiment 9, the first signaling is used to indicate the third time-domain resource block and the fourth time-domain resource block, the third time-domain resource block and the fourth time-domain resource block being orthogonal, the third time-domain resource block and the fourth time-domain resource block both belong to the reference time window, each of the first signal and the second signal is a first-type signal, the first node maintains power consistency and phase continuity between the first signal and the second signal; each of the first reference signal and the second reference signal is a first-type reference signal, where the first-type signals are different from the first-type reference signals.

In one embodiment, the first signaling is a higher layer signaling.

In one embodiment, the first signaling is an RRC signaling.

In one embodiment, the first signaling is a physical layer signaling.

In one embodiment, the first signaling is a Downlink Control Information (DCI) signaling.

In one embodiment, the first signaling is an uplink DCI signaling.

In one embodiment, the first signaling is a DCI signaling scheduling a Physical Uplink Shared Channel (PUSCH).

In one embodiment, the first signaling is a DCI signaling triggering a Configured Grant PUSCH.

In one embodiment, the first signaling indicates a Configured Grant PUSCH.

In one embodiment, the first signaling is a DCI signaling scheduling a PUSCH repetition.

In one embodiment, the first signaling is a DCI signaling triggering a Configured Grant PUSCH repetition.

In one embodiment, the first signaling indicates a Configured Grant PUSCH repetition.

In one embodiment, a number of symbols comprised in the fourth time-domain resource block is equal to a number of symbols comprised in the third time-domain resource block.

In one embodiment, a duration of the third time-domain resource block is the same as a duration of the fourth time-domain resource block.

In one embodiment, the reference time window only comprises the third time-domain resource block and the fourth time-domain resource block.

In one embodiment, the reference time window also comprises time-domain resources other than the third time-domain resource block and the fourth time-domain resource block.

In one embodiment, the third time-domain resource block and the fourth time-domain resource block are both orthogonal with the first time-domain resource block, and the third time-domain resource block and the fourth time-domain resource block are both orthogonal with the second time-domain resource block.

In one embodiment, the first time-domain resource block is earlier than the third time-domain resource block and the fourth time-domain resource block.

In one embodiment, the second time-domain resource block is earlier than the third time-domain resource block and the fourth time-domain resource block.

In one embodiment, the first time-domain resource block is later than the third time-domain resource block and the fourth time-domain resource block.

In one embodiment, the second time-domain resource block is later than the third time-domain resource block and the fourth time-domain resource block.

In one embodiment, the first time-domain resource block is later than the third time-domain resource block and earlier than the fourth time-domain resource block.

In one embodiment, the second time-domain resource block is later than the third time-domain resource block and earlier than the fourth time-domain resource block.

In one embodiment, the first time-domain resource block is earlier than the third time-domain resource block, and the second time-domain resource block is later than the third time-domain resource block.

In one embodiment, the first time-domain resource block is earlier than the fourth time-domain resource block, and the second time-domain resource block is later than the fourth time-domain resource block.

In one embodiment, the third time-domain resource block comprises at least one symbol, while the fourth time-domain resource block comprises at least one symbol.

In one embodiment, the third time-domain resource block comprises one symbol or multiple consecutive symbols, while the fourth time-domain resource block comprises one symbol or multiple consecutive symbols.

In one embodiment, the third time-domain resource block consists of time-domain resources occupied by the first signal, while the fourth time-domain resource block consists of time-domain resources occupied by the second signal.

In one embodiment, the third time-domain resource block only comprises time-domain resources occupied by the first signal, while the fourth time-domain resource block only comprises time-domain resources occupied by the second signal.

In one embodiment, the third time-domain resource block comprises time-domain resources occupied by the first signal, and the third time-domain resource block also comprises time-domain resources other than those occupied by the first signal.

In one embodiment, the fourth time-domain resource block comprises time-domain resources occupied by the second signal, and the fourth time-domain resource block also comprises time-domain resources other than those occupied by the second signal.

In one embodiment, the third time-domain resource block and the fourth time-domain resource block are respectively two time-domain resource blocks among N orthogonal time-domain resource blocks; N is a positive integer greater than 1.

In one embodiment, the third time-domain resource block and the fourth time-domain resource block are respectively two adjacent time-domain resource blocks among the N orthogonal time-domain resource blocks.

In one embodiment, the phrase that "the first time-domain resource block and the second time-domain resource block are orthogonal" comprises a meaning that the first time-domain resource block and the second time-domain resource block are non-overlapping.

In one embodiment, the phrase that "the first time-domain resource block and the second time-domain resource block are orthogonal" comprises a meaning that the first time-domain resource block and the second time-domain resource block do not comprise a same symbol.

In one embodiment, the phrase that "the first time-domain resource block and the second time-domain resource block are orthogonal" comprises a meaning that any symbol in the first time-domain resource block does not belong to the second time-domain resource block.

In one embodiment, the phrase of "N orthogonal time-domain resource blocks" means that any two of the N orthogonal time-domain resource blocks do not comprise a same symbol.

In one embodiment, the phrase of "N orthogonal time-domain resource blocks" means that any two of the N orthogonal time-domain resource blocks are orthogonal.

In one embodiment, the phrase that "the first signaling is used to indicate the third time-domain resource block and the fourth time-domain resource block" comprises a meaning that the first signaling indicates at least one of the third time-domain resource block or the fourth time-domain resource block.

In one embodiment, the phrase that "the first signaling is used to indicate the third time-domain resource block and the fourth time-domain resource block" comprises a meaning that the first signaling indicates only one of the third time-domain resource block or the fourth time-domain resource block.

In one embodiment, the phrase that "the first signaling is used to indicate the third time-domain resource block and the fourth time-domain resource block" comprises a meaning that the first signaling indicates an earlier one of the third time-domain resource block and the fourth time-domain resource block.

In one subembodiment, the third time-domain resource block is earlier than the fourth time-domain resource block; the first signaling indicates the third time-domain resource block, the fourth time-domain resource block is later than the third time-domain resource block and a number of symbols comprised in the fourth time-domain resource block is equal to a number of symbols comprised in the third time-domain resource block.

In one subembodiment, the fourth time-domain resource block is earlier than the third time-domain resource block; the first signaling indicates the fourth time-domain resource block, the third time-domain resource block is later than the fourth time-domain resource block and a number of symbols comprised in the third time-domain resource block is equal to a number of symbols comprised in the fourth time-domain resource block.

In one embodiment, the phrase that "the first signaling is used to indicate the third time-domain resource block and the fourth time-domain resource block" comprises a meaning that the first signaling indicates an earliest one of the N orthogonal time-domain resource blocks, where the third time-domain resource block and the fourth time-domain resource block are respectively two time-domain resource blocks among the N orthogonal time-domain resource blocks; N is a positive integer greater than 1.

In one embodiment, the phrase that "the first signaling is used to indicate the third time-domain resource block and the fourth time-domain resource block" comprises a meaning that the first signaling comprises a first field, the first field in the first signaling being used for indicating the third time-domain resource block and the fourth time-domain resource block.

In one embodiment, the phrase that "the first field in the first signaling being used for indicating the third time-domain resource block and the fourth time-domain resource block" comprises a meaning that the first field in the first signaling indicates at least one of the third time-domain resource block or the fourth time-domain resource block.

In one embodiment, the phrase that "the first field in the first signaling being used for indicating the third time-domain resource block and the fourth time-domain resource block" comprises a meaning that the first field in the first signaling indicates only one of the third time-domain resource block or the fourth time-domain resource block.

In one embodiment, the phrase that "the first field in the first signaling being used for indicating the third time-domain resource block and the fourth time-domain resource block" comprises a meaning that the first field in the first signaling indicates an earlier one of the third time-domain resource block and the fourth time-domain resource block.

In one subembodiment, the third time-domain resource block is earlier than the fourth time-domain resource block; the first field in the first signaling indicates the third time-domain resource block, the fourth time-domain resource block is later than the third time-domain resource block and a number of symbols comprised in the fourth time-domain resource block is equal to a number of symbols comprised in the third time-domain resource block.

In one subembodiment, the fourth time-domain resource block is earlier than the third time-domain resource block; the first field in the first signaling indicates the fourth time-domain resource block, the third time-domain resource block is later than the fourth time-domain resource block and a number of symbols comprised in the third time-domain resource block is equal to a number of symbols comprised in the fourth time-domain resource block.

In one embodiment, the phrase that "the first field in the first signaling being used for indicating the third time-domain resource block and the fourth time-domain resource block" comprises a meaning that the first field in the first signaling indicates an earliest one of the N orthogonal time-domain resource blocks, where the third time-domain resource block and the fourth time-domain resource block are respectively two time-domain resource blocks among the N orthogonal time-domain resource blocks; N is a positive integer greater than 1.

In one embodiment, the first field comprises at least one bit.

In one embodiment, a number of bits comprised in the first field is configured by a higher layer parameter.

In one embodiment, the first field is a Time domain resource assignment field.

In one embodiment, for the specific definition of the Time domain resource assignment field, refer to 3GPP TS38.212, Chapter 7.3.1.

In one embodiment, the phrase that "the first signaling is used to indicate the third time-domain resource block and the fourth time-domain resource block" comprises a meaning that the first signaling is used to indicate the reference time window, with the third time-domain resource block and the fourth time-domain resource block both belonging to the reference time window.

In one embodiment, the phrase that "the first signaling is used to indicate the reference time window" comprises a meaning that the first signaling explicitly indicates the reference time window.

In one embodiment, the phrase that "the first signaling is used to indicate the reference time window" comprises a meaning that the first signaling implicitly indicates the reference time window.

In one embodiment, the phrase that "the first signaling is used to indicate the reference time window" comprises a meaning that the first signaling indicates a start of the reference time window.

In one embodiment, the phrase that "the first signaling is used to indicate the reference time window" comprises a meaning that the first signaling indicates a starting symbol of the reference time window.

In one embodiment, the phrase that "the first signaling is used to indicate the reference time window" comprises a meaning that the first signaling indicates a start of the reference time window, with a duration of the reference time window being indicated by a higher-layer parameter.

In one embodiment, the phrase that "the first signaling is used to indicate the reference time window" comprises a meaning that the first signaling indicates a starting symbol of the reference time window, with a number of symbols comprised in the reference time window being indicated by a higher-layer parameter.

In one embodiment, the phrase that "the first signaling is used to indicate the reference time window" comprises a meaning that the first signaling indicates a starting symbol of the reference time window, with a duration of the reference time window being indicated by a higher-layer parameter.

In one embodiment, the phrase that "the first signaling is used to indicate the reference time window" comprises a meaning that the first signaling indicates a start of the reference time window and a duration of the reference time window.

In one embodiment, the phrase that "the first signaling is used to indicate the reference time window" comprises a meaning that the first signaling indicates a starting symbol of the reference time window and a number of symbols comprised in the reference time window.

In one embodiment, the phrase that "the first signaling is used to indicate the reference time window" comprises a meaning that the first signaling indicates a start of the reference time window and an end of the reference time window.

In one embodiment, the phrase that "the first signaling is used to indicate the reference time window" comprises a meaning that the first signaling indicates a starting symbol of the reference time window and an ending symbol of the reference time window.

In one embodiment, the phrase that "the first signaling indicates a start of the reference time window" comprises a meaning that the first signaling comprises a second field, the second field in the first signaling indicating a start of the reference time window, where the second field is different from the first field.

In one embodiment, the phrase that "the first signaling indicates a start of the reference time window" comprises a meaning that the first field in the first signaling indicates a start of the reference time window.

In one embodiment, the phrase that "the first signaling indicates a start of the reference time window" comprises a meaning that the first field in the first signaling indicates a start time of the N orthogonal time-domain resource blocks, where a start of the reference time window is the start time of the N orthogonal time-domain resource blocks.

In one embodiment, the phrase that "the first signaling indicates a start of the reference time window" comprises a meaning that the first field in the first signaling is used to indicate the third time-domain resource block and the fourth time-domain resource block, where a start of the reference time window is the start time of an earlier time-domain resource block of the third time-domain resource block and the fourth time-domain resource block.

In one embodiment, the phrase that "the first signaling indicates a starting symbol of the reference time window" comprises a meaning that the first signaling comprises a second field, the second field in the first signaling indicating a starting symbol of the reference time window, where the second field is different from the first field.

In one embodiment, the phrase that "the first signaling indicates a starting symbol of the reference time window" comprises a meaning that the first field in the first signaling indicates a starting symbol of the reference time window.

In one embodiment, the phrase that "the first signaling indicates a starting symbol of the reference time window" comprises a meaning that the first field in the first signaling indicates a starting symbol of the N orthogonal time-domain resource blocks, where a starting symbol of the reference time window is the starting symbol of the N orthogonal time-domain resource blocks.

In one embodiment, the phrase that "the first signaling indicates a starting symbol of the reference time window" comprises a meaning that the first field in the first signaling is used to indicate the third time-domain resource block and the fourth time-domain resource block, where a starting symbol of the reference time window is the starting symbol of an earlier time-domain resource block of the third time-domain resource block and the fourth time-domain resource block.

In one embodiment, the first signal comprises a physical layer channel transmission, while the second signal comprises a physical layer channel transmission.

In one embodiment, the first signal comprises a PUSCH transmission, while the second signal comprises a PUSCH transmission.

In one embodiment, the first signal comprises a PUCCH transmission, while the second signal comprises a PUCCH transmission.

In one embodiment, the first signal and the second signal both comprise a repetition of a first bit block.

In one embodiment, the first signal and the second signal respectively comprise two repetitions of a first bit block.

In one embodiment, the first bit block comprises a positive integer number of bit(s).

In one embodiment, the first bit block comprises one Transport Block (TB).

In one embodiment, the first bit block comprises at least one Transport Block (TB).

In one embodiment, the first bit block comprises at least one Code Block Group (CBG).

In one embodiment, a repetition of a said first bit block is obtained by the first bit block sequentially through CRC Insertion, Channel Coding, Rate matching, Scrambling, and Modulation, Layer Mapping, Precoding, and Mapping to Resource Element, OFDM Baseband Signal Generation and Modulation and Up conversion.

In one embodiment, a repetition of a said first bit block is obtained by the first bit block sequentially through CRC Insertion, Channel Coding, Rate matching, Scrambling, and Modulation, Layer Mapping, Precoding, Mapping to Virtual Resource Blocks and Mapping from Virtual to Physical Resource Blocks, OFDM Baseband Signal Generation and Modulation and Up conversion.

In one embodiment, a repetition of a said first bit block is obtained by the first bit block sequentially through CRC Insertion, Segmentation, Code-Block (CB)-level CRC Insertion, Channel Coding, Rate matching, Concatenation, Scrambling, and Modulation, Layer Mapping, Precoding, and Mapping to Resource Element, OFDM Baseband Signal Generation and Modulation and Up conversion.

In one embodiment, a Redundancy Version (RV) value of the first signal and an RV value of the second signal are two consecutive candidate values in a group of candidate values.

In one embodiment, frequency-domain resources occupied by the first signal and frequency-domain resources occupied by the second signal belong to a same Band Width Part (BWP).

In one subembodiment, two said first-type signals belong to a same said BWP in frequency domain.

In one embodiment, frequency-domain resources occupied by the first signal and frequency-domain resources occupied by the second signal belong to a same BWP group, the BWP group comprising at least one BWP.

In one subembodiment, two said first-type signals belong to a same said BWP group in frequency domain.

In one embodiment, frequency-domain resources occupied by the first signal and frequency-domain resources occupied by the second signal belong to a same carrier, the carrier group comprising at least one carrier.

In one subembodiment, two said first-type signals belong to a same said carrier in frequency domain.

In one embodiment, frequency-domain resources occupied by the first signal and frequency-domain resources occupied by the second signal belong to a same carrier group.

In one subembodiment, two said first-type signals belong to a same said carrier group in frequency domain.

In one embodiment, frequency-domain resources occupied by the first signal and frequency-domain resources occupied by the second signal belong to a same serving cell.

In one subembodiment, two said first-type signals belong to a same said serving cell in frequency domain.

In one embodiment, frequency-domain resources occupied by the first signal and frequency-domain resources occupied by the second signal belong to a same serving cell group, the serving cell group comprising at least one serving cell.

In one subembodiment, two said first-type signals belong to a same said serving cell group in frequency domain.

In one embodiment, frequency-domain resources occupied by the first signal and frequency-domain resources occupied by the second signal are the same.

In one embodiment, the phrase that "the first-type signals are different from the first-type reference signals" comprises a meaning that the first-type signal is not a reference signal while the first-type reference signal is a reference signal.

In one embodiment, the phrase that "the first-type signals are different from the first-type reference signals" comprises a meaning that the first-type signal has a different name from the first-type reference signal.

In one embodiment, the phrase that "the first-type signals are different from the first-type reference signals" comprises a meaning that the first-type signal is of a different type from that of the first-type reference signal.

In one embodiment, the phrase that "the first-type signals are different from the first-type reference signals" comprises a meaning that a said first-type signal occupies a physical-layer channel while a said first-type reference signal comprises a reference signal.

In one embodiment, a said first-type signal is not a reference signal.

In one embodiment, a said first-type signal occupies a physical layer channel.

In one embodiment, a type of the first-type signal includes at least one of a PUSCH or a PUCCH.

In one embodiment, a type of the first-type signal includes a PUSCH.

In one embodiment, a type of the first-type signal includes a PUCCH.

In one embodiment, the first-type reference signal is a sounding reference signal.

In one embodiment, the first-type reference signal is a phase tracking reference signal.

In one embodiment, the first-type reference signal includes a sounding reference signal.

In one embodiment, the first-type reference signal includes a phase tracking reference signal.

In one embodiment, the first-type reference signal includes at least one of a sounding reference signal or a phase tracking reference signal.

Embodiment 10

Embodiment 10 illustrates a schematic diagram of a first DMRS and a second DMRS according to one embodiment of the present application, as shown in FIG. 10.

In Embodiment 10, the first transmitter 1202 also transmits a first DeModulation Reference Signal (DMRS) and a second DMRS respectively in the third time-domain resource block and the fourth time-domain resource block; wherein a same DMRS is used for demodulating the first signal and the second signal, the same DMRS including the first DMRS and the second DMRS.

In one embodiment, the first DMRS and the second DMRS respectively belong to the third time-domain resource block and the fourth time-domain resource block in time domain.

In one embodiment, the same DeModulation Reference Signal (DMRS) only includes the first DMRS and the second DMRS.

In one embodiment, the same DeModulation Reference Signal (DMRS) also includes a reference signal other than the first DMRS and the second DMRS.

Embodiment 11

Embodiment 11 illustrates a schematic diagram of a first reference signal power and a second reference signal power according to one embodiment of the present application, as shown in FIG. 11.

In Embodiment 11, the second time-domain resource block is later than the first time-domain resource block; when the first condition set is satisfied, the phrase of "the power consistency between the first reference signal and the second reference signal" means that a power of the second reference signal follows a power of the first reference signal.

In one embodiment, the phrase that "a power of the second reference signal follows a power of the first reference signal" comprises a meaning that the power of the second reference signal is not updated.

In one embodiment, the phrase that "a power of the second reference signal follows a power of the first reference signal" comprises a meaning that the power of the second reference signal is not updated on the power of the first reference signal.

In one embodiment, the phrase that "a power of the second reference signal follows a power of the first reference signal" comprises a meaning that the power of the second reference signal is consistent with the power of the first reference signal.

In one embodiment, the phrase that "a power of the second reference signal follows a power of the first reference signal" comprises a meaning that the power of the second reference signal is kept the same as the power of the first reference signal.

In one embodiment, the phrase that "a power of the second reference signal follows a power of the first reference signal" comprises a meaning that the power of the second reference signal is set to the power of the first reference signal.

In one embodiment, the phrase that "a power of the second reference signal follows a power of the first reference signal" comprises a meaning that a third signaling is used for indicating the second parameter, the power of the second reference signal being unrelated to the second parameter.

In one embodiment, the phrase that "a power of the second reference signal follows a power of the first reference signal" comprises a meaning that the second parameter is used to determine a second power, the power of the second reference signal being unrelated to the second power.

In one embodiment, the phrase that "a power of the second reference signal follows a power of the first reference signal" comprises a meaning that a third signaling is used for indicating the second time-domain resource block, the power of the second reference signal being unrelated to the third signaling.

In one embodiment, the phrase that "a power of the second reference signal follows a power of the first reference signal" comprises a meaning that a third signaling is used for indicating the second reference signal, the power of the second reference signal being unrelated to the third signaling.

In one embodiment, of a power of the first reference signal or a power of the second reference signal at least the power of the second reference signal is related to whether the first condition set is satisfied.

In one embodiment, of a power of the first reference signal and a power of the second reference signal only the power of the second reference signal is related to whether the first condition set is satisfied.

In one embodiment, both a power of the first reference signal and a power of the second reference signal are related to whether the first condition set is satisfied.

In one embodiment, when the first condition set is unsatisfied, a power of the first reference signal is a first power.

In one embodiment, a power of the first reference signal is a first power.

In one embodiment, a power of the first reference signal is unrelated to whether the first condition set is satisfied.

In one embodiment, a power of the first reference signal is a first power whether or not the first condition set is being satisfied.

In one embodiment, when the first condition set is unsatisfied, a power of the second reference signal is a second power.

In one embodiment, when the first condition set is satisfied, a power of the second reference signal and a power of the first reference signal are both a first power.

In one embodiment, when the first condition set is satisfied, both a power of the second reference signal and a power of the first reference signal are a first power; when the first condition set is unsatisfied, a power of the first reference signal is the first power, and a power of the second reference signal is a second power.

In one embodiment, a first parameter is used to determine a first power, while a second parameter is used to determine a second power.

In one embodiment, the first parameter is a maximum output power on the first time-domain resource block, while the second parameter is a maximum output power on the second time-domain resource block.

In one embodiment, the first parameter is a power control adjustment state, while the second parameter is a power control adjustment state.

In one embodiment, the first parameter is a Transmit power control (TPC) command, while the second parameter is a TPC command.

In one embodiment, the first parameter is a Band Width Part (BWP) index, while the second parameter is a BWP index.

In one embodiment, the first parameter is an index of a slot to which the first time-domain resource block belongs, while the second parameter is an index of a slot to which the second time-domain resource block belongs.

In one embodiment, the first parameter is an index of a subframe to which the first time-domain resource block belongs, while the second parameter is an index of a subframe to which the second time-domain resource block belongs.

In one embodiment, the first parameter is an index of a transmission occasion to which the first time-domain resource block belongs, while the second parameter is an index of a transmission occasion to which the second time-domain resource block belongs.

In one embodiment, the first parameter is an index of a transmission occasion comprised in the first time-domain resource block, while the second parameter is an index of a transmission occasion comprised in the second time-domain resource block.

In one embodiment, the first parameter is an index of the first time-domain resource block, while the second parameter is an index of the second time-domain resource block.

In one embodiment, the first parameter is an index of a transmission occasion to which the first reference signal belongs, while the second parameter is an index of a transmission occasion occupied by the second reference signal.

In one embodiment, a second signaling is used for indicating the first parameter.

In one embodiment, the first parameter is indicated by a higher-layer parameter.

In one embodiment, a third signaling is used for indicating the second parameter.

In one embodiment, the second parameter is indicated by a higher-layer parameter.

In one embodiment, a second signaling is used to indicate the first time-domain resource block.

In one embodiment, a second signaling is used to indicate the first time-domain resource block and the second time-domain resource block.

In one embodiment, a third signaling is used to indicate the second time-domain resource block.

In one embodiment, a second signaling is used to indicate the first time-domain resource block, while a third signaling is used to indicate the second time-domain resource block.

In one embodiment, a second signaling is a physical layer signaling.

In one embodiment, a second signaling is a DCI signaling.

In one embodiment, a second signaling is a higher layer signaling.

In one embodiment, a second signaling is an RRC signaling.

In one embodiment, the first parameter is a maximum output power on the first time-domain resource block, while the second parameter is a maximum output power on the second time-domain resource block, the transmit power for the first reference signal is no greater than the first parameter, while the transmit power for the second reference signal is no greater than the second parameter.

In one embodiment, the phrase that "a first parameter is used to determine a first power" means that the first parameter is a maximum output power on the first time-domain resource block, the first power being no greater than the first parameter; the phrase that "a second parameter is used to determine a second power" means that the second parameter is a maximum output power on the second time-domain resource block, the second power being no greater than the second parameter.

In one embodiment, the phrase that "a first parameter is used to determine a first power" means that the first parameter is used to determine a first component, the first power is a smaller value of a first reference power and a first power threshold, the first reference power being linear with the first component; the phrase that "a second parameter is used to determine a second power" means that the second parameter is used to determine a second component, the second power is a smaller value of a second reference power and a second power threshold, the second reference power being linear with the second component; the first power threshold is a maximum output power on the first time-domain resource block, while the second power threshold is a maximum output power on the second time-domain resource block.

In one embodiment, the phrase that "the first parameter is used to determine a first component" means that the first component is linear with the first parameter; the phrase that "the second parameter is used to determine a second component" means that the second component is linear with the second parameter.

In one embodiment, the phrase that "the first parameter is used to determine a first component" means that the first component is non-linear with the first parameter; the phrase that "the second parameter is used to determine a second component" means that the second component is non-linear with the second parameter.

In one embodiment, the phrase that "the first parameter is used to determine a first component" means that the first component is functionally correlated with the first parameter; the phrase that "the second parameter is used to determine a second component" means that the second component is functionally correlated with the second parameter.

In one embodiment, the phrase that "the first parameter is used to determine a first component" means that the first component is functionally correlated with the first parameter; the phrase that "the second parameter is used to determine a second component" means that the second component is mapped by or to the second parameter.

In one embodiment, the phrase that "the first parameter is used to determine a first component" means that the first component is related to a transmission occasion indicated by the first parameter; the phrase that "the second parameter is used to determine a second component" means that the second component is related to a transmission occasion indicated by the second parameter.

In one embodiment, the phrase "power" is measured in deciBel relative to one Milliwatt (dBm).

In one embodiment, the first power threshold is measured in deciBel relative to one Milliwatt (dBm), and the second power threshold is measured in deciBel relative to one Milliwatt (dBm).

Embodiment 12

Embodiment 12 illustrates a schematic diagram of a first reference signal power and a second reference signal power according to another embodiment of the present application, as shown in FIG. 12.

In Embodiment 12, when the first condition set is satisfied, the phrase of "the power consistency between the first reference signal and the second reference signal" means that both a power of the first reference signal and a power of the second reference signal are related to a power of the first signal.

In one embodiment, whether the first condition set is satisfied is used to determine whether a power of the first reference signal and a power of the second reference signal are related to a power of the first signal.

In one embodiment, whether a power of the first reference signal and a power of the second reference signal are related to a power of the first signal depends on whether the first condition set is satisfied.

In one embodiment, when the first condition set is satisfied, both a power of the second reference signal and a power of the first reference signal are related to a power of the first signal; when the first condition set is unsatisfied, both a power of the second reference signal and a power of the first reference signal are unrelated to a power of the first signal.

In one embodiment, when the first condition set is satisfied, both a power of the second reference signal and a power of the first reference signal are related to a power of the first signal; when the first condition set is unsatisfied, a power of the first reference signal is the first power, and a power of the second reference signal is a second power.

Embodiment 13

Embodiment 13 illustrates a structure block diagram of a processing device used in a first node according to one embodiment of the present application; as shown in FIG. 13. In FIG. 13, a processing device 1200 in the first node is comprised of a first receiver 1201 and a first transmitter 1202, where the first receiver 1201 is optional.

In one embodiment, the first node is a UE.

In one embodiment, the first node is a relay node.

In one embodiment, the first receiver 1201 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1202 comprises at least one of the antenna 452, the transmitter 454, the transmitting processor 468, the multi-antenna transmitting processor 457, the controller/processor 459, the memory 460 or the data source 467 in Embodiment 4.

The first transmitter 1202 transmits a first reference signal and a second reference signal respectively in a first time-domain resource block and a second time-domain resource block.

In Embodiment 13, the first node maintains power consistency and phase continuity among multiple first-type signals belonging to a reference time window in time domain; a duration of the reference time window is not larger than a first threshold; the first time-domain resource block and the second time-domain resource block are orthogonal, at least one of the first time-domain resource block or the second time-domain resource block belonging to the reference time window; the first reference signal and the second reference signal respectively belong to different transmission occasions; whether the first node maintains power consistency and phase continuity between the first reference signal and the second reference signal is related to whether a first condition set is being satisfied; when and only when the first condition set is satisfied, the first node maintains the power consistency and phase continuity between the first reference signal and the second reference signal; the first condition set comprises a first condition; the first condition comprises: the first reference signal and the second reference signal being identified by a same index, and, the first time-domain resource block and the second time-domain resource block both belonging to the reference time window.

In one embodiment, the first condition set comprises more than one condition, with the first condition being a condition in the first condition set; when each condition in the first condition set is satisfied, the first condition set is satisfied; the first condition set also comprises a second condition, the second condition being a condition in the first condition set; the second condition comprises frequency-domain resources occupied by the first reference signal and frequency-domain resources occupied by the second reference signal being the same.

In one embodiment, the second time-domain resource block is later than the first time-domain resource block; when the first condition set is satisfied, the phrase of "the power consistency between the first reference signal and the second reference signal" means that a power of the second reference signal follows a power of the first reference signal.

In one embodiment, time-frequency resources occupied by the first reference signal and time-frequency resources occupied by the second reference signal are related to whether the first condition set is being satisfied; when the first condition set is satisfied, a first reference signal pattern is used to determine the time-frequency resources occupied by the first reference signal and the time-frequency resources occupied by the second reference signal; when the first condition set is not being satisfied, a second reference signal pattern is used to determine the time-frequency resources occupied by the first reference signal and the time-frequency resources occupied by the second reference signal; the first reference signal pattern is different from the second reference signal pattern.

In one embodiment, the first node is comprises of:

the first receiver 1201, which receives a first signaling; and the first transmitter 1202, which also transmits a first signal and a second signal respectively in a third time-domain resource block and a fourth time-domain resource block;

herein, the first signaling is used to indicate the third time-domain resource block and the fourth time-domain resource block, the third time-domain resource block and the fourth time-domain resource block being orthogonal, the third time-domain resource block and the fourth time-domain resource block both belong to the reference time window, each of the first signal and the second signal is a first-type signal, the first node maintains power consistency and phase continuity between the first signal and the second signal; each of the first reference signal and the second reference signal is a first-type reference signal, where the first-type signals are different from the first-type reference signals.

In one embodiment, the first transmitter 1202 also transmits a first DeModulation Reference Signal (DMRS) and a second DMRS respectively in the third time-domain resource block and the fourth time-domain resource block; wherein a same DMRS is used for demodulating the first signal and the second signal, the same DMRS including the first DMRS and the second DMRS.

In one embodiment, when the first condition set is satisfied, the phrase of "the power consistency between the first reference signal and the second reference signal" means that both a power of the first reference signal and a power of the second reference signal are related to a power of the first signal.

Embodiment 14

Embodiment 14 illustrates a structure block diagram of a processing device used in a second node according to one embodiment of the present application; as shown in FIG. 14. In FIG. 14, a processing device 1300 in a second node is comprised of a second transmitter 1301 and a second receiver 1302, where the second transmitter 1301 is optional.

In one embodiment, the second node is a base station.
In one embodiment, the second node is a UE.
In one embodiment, the second node is a relay node.
In one embodiment, the second transmitter 1301 comprises at least one of the antenna 420, the transmitter 418, the transmitting processor 416, the multi-antenna transmitting processor 471, the controller/processor 475 or the memory 476 in Embodiment 4.

In one embodiment, the second receiver 1302 comprises at least one of the antenna 420, the receiver 418, the receiving processor 470, the multi-antenna receiving processor 472, the controller/processor 475 or the memory 476 in Embodiment 4.

The second receiver 1302 receives a first reference signal and a second reference signal respectively in a first time-domain resource block and a second time-domain resource block.

In Embodiment 14, a transmitter of the first reference signal and the second reference signal maintains power consistency and phase continuity among multiple first-type signals belonging to a reference time window in time domain; a duration of the reference time window is not larger than a first threshold; the first time-domain resource block and the second time-domain resource block are orthogonal, at least one of the first time-domain resource block or the second time-domain resource block belonging to the reference time window; the first reference signal and the second reference signal respectively belong to different transmission occasions; whether the transmitter of the first reference signal and the second reference signal maintains power consistency and phase continuity between the first reference signal and the second reference signal depends on whether a first condition set is being satisfied; when and only when the first condition set is satisfied, the transmitter of the first reference signal and the second reference signal maintains the power consistency and phase continuity between the first reference signal and the second reference signal; the first condition set comprises a first condition; the first condition comprises: the first reference signal and the second reference signal being identified by a same index, and, the first time-domain resource block and the second time-domain resource block both belonging to the reference time window.

In one embodiment, the first condition set comprises more than one condition, with the first condition being a condition in the first condition set; when each condition in the first condition set is satisfied, the first condition set is satisfied; the first condition set also comprises a second condition, the second condition being a condition in the first condition set; the second condition comprises frequency-domain resources occupied by the first reference signal and frequency-domain resources occupied by the second reference signal being the same.

In one embodiment, the second time-domain resource block is later than the first time-domain resource block; when the first condition set is satisfied, the phrase of "the power consistency between the first reference signal and the second reference signal" means that a power of the second reference signal follows a power of the first reference signal.

In one embodiment, time-frequency resources occupied by the first reference signal and time-frequency resources occupied by the second reference signal are related to whether the first condition set is being satisfied; when the first condition set is satisfied, a first reference signal pattern is used to determine the time-frequency resources occupied by the first reference signal and the time-frequency resources occupied by the second reference signal; when the first condition set is not being satisfied, a second reference signal pattern is used to determine the time-frequency resources occupied by the first reference signal and the time-frequency resources occupied by the second reference signal; the first reference signal pattern is different from the second reference signal pattern.

In one embodiment, the second node is comprises of:
a second transmitter 1301, which transmits a first signaling; and
the second receiver 1302, which also receives a first signal and a second signal respectively in a third time-domain resource block and a fourth time-domain resource block;

herein, the first signaling is used to indicate the third time-domain resource block and the fourth time-domain resource block, the third time-domain resource block and the fourth time-domain resource block being orthogonal, the third time-domain resource block and the fourth time-domain resource block both belong to the reference time window, each of the first signal and the second signal is a first-type signal, the transmitter of the first reference signal and the second reference signal maintains power consistency and phase continuity between the first signal and the second signal; each of the first reference signal and the second reference signal is a first-type reference signal, where the first-type signals are different from the first-type reference signals.

In one embodiment, the second receiver also receives a first DeModulation Reference Signal (DMRS) and a second DMRS respectively in the third time-domain resource block and the fourth time-domain resource block; where a same DMRS is used for demodulating the first signal and the second signal, the same DMRS including the first DMRS and the second DMRS.

In one embodiment, when the first condition set is satisfied, the phrase of "the power consistency between the first reference signal and the second reference signal" means that both a power of the first reference signal and a power of the second reference signal are related to a power of the first signal.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present application includes but is not limited to macrocellular base stations, micro-cellular base stations, home base stations, relay base station, gNB (NR node B), Transmitter Receiver Point (TRP), and other radio communication equipment.

The above are merely the preferred embodiments of the present application and are not intended to limit the scope of protection of the present application. Any change or revision made based on embodiments described herein, if, by which partial or all of similar technical effects can be achieved, shall be deemed as apparent and covered within the scope of protection of the present application.

What is claimed is:

1. A first node for wireless communications, comprising:
a first transmitter, transmitting a first reference signal and a second reference signal respectively in a first time-domain resource block and a second time-domain resource block;
wherein the first node maintains power consistency and phase continuity among multiple first-type signals belonging to a reference time window in time domain; a duration of the reference time window is not larger than a first threshold; the first time-domain resource block and the second time-domain resource block are orthogonal, at least one of the first time-domain resource block or the second time-domain resource block belonging to the reference time window; the first reference signal and the second reference signal respectively belong to different transmission occasions; whether the first node maintains power consistency and phase continuity between the first reference signal and the second reference signal is related to whether a first condition set is satisfied; when and only when the first condition set is satisfied, the first node maintains the power consistency and phase continuity between the first reference signal and the second reference signal; the first condition set comprises a first condition; the first condition comprises: the first reference signal and the second reference signal being identified by a same index, and, the first time-domain resource block and the second time-domain resource block both belonging to the reference time window.

2. The first node according to claim 1, wherein the first condition set comprises more than one condition, with the first condition being a condition in the first condition set; when each condition in the first condition set is satisfied, the first condition set is satisfied; the first condition set also comprises a second condition, the second condition being a condition in the first condition set; the second condition comprises frequency-domain resources occupied by the first reference signal and frequency-domain resources occupied by the second reference signal being the same;
or, the second time-domain resource block is later than the first time-domain resource block; when the first condition set is satisfied, a phrase of "the power consistency between the first reference signal and the second reference signal" means that a power of the second reference signal follows a power of the first reference signal.

3. The first node according to claim 1, wherein time-frequency resources occupied by the first reference signal and time-frequency resources occupied by the second reference signal are related to whether the first condition set is satisfied; when the first condition set is satisfied, a first reference signal pattern is used to determine the time-frequency resources occupied by the first reference signal and the time-frequency resources occupied by the second reference signal; when the first condition set is not satisfied, a second reference signal pattern is used to determine the time-frequency resources occupied by the first reference signal and the time-frequency resources occupied by the second reference signal; the first reference signal pattern is different from the second reference signal pattern.

4. The first node according to claim 1, comprising:
a first receiver, receiving a first signaling;
the first transmitter, also transmitting a first signal and a second signal respectively in a third time-domain resource block and a fourth time-domain resource block;
wherein the first signaling is used to indicate the third time-domain resource block and the fourth time-domain resource block, the third time-domain resource block and the fourth time-domain resource block being orthogonal, the third time-domain resource block and the fourth time-domain resource block both belong to the reference time window, each of the first signal and the second signal is a first-type signal, the first node maintains power consistency and phase continuity between the first signal and the second signal; each of the first reference signal and the second reference signal is a first-type reference signal, where the first-type signals are different from the first-type reference signals.

5. The first node according to claim 4, wherein the first transmitter also transmits a first DeModulation Reference Signal (DMRS) and a second DMRS respectively in the third time-domain resource block and the fourth time-domain resource block; wherein a same DMRS is used for demodulating the first signal and the second signal, the same DMRS including the first DMRS and the second DMRS;
or, when the first condition set is satisfied, a phrase of "the power consistency between the first reference signal and the second reference signal" means that both a power of the first reference signal and a power of the second reference signal are related to a power of the first signal.

6. A second node for wireless communications, comprising:
a second receiver, receiving a first reference signal and a second reference signal respectively in a first time-domain resource block and a second time-domain resource block;

wherein a transmitter of the first reference signal and the second reference signal maintains power consistency and phase continuity among multiple first-type signals belonging to a reference time window in time domain; a duration of the reference time window is not larger than a first threshold; the first time-domain resource block and the second time-domain resource block are orthogonal, at least one of the first time-domain resource block or the second time-domain resource block belonging to the reference time window; the first reference signal and the second reference signal respectively belong to different transmission occasions; whether the transmitter of the first reference signal and the second reference signal maintains power consistency and phase continuity between the first reference signal and the second reference signal is related to whether a first condition set is satisfied; when and only when the first condition set is satisfied, the transmitter of the first reference signal and the second reference signal maintains the power consistency and phase continuity between the first reference signal and the second reference signal; the first condition set comprises a first condition; the first condition comprises: the first reference signal and the second reference signal being identified by a same index, and, the first time-domain resource block and the second time-domain resource block both belonging to the reference time window.

7. The second node according to claim 6, wherein the first condition set comprises more than one condition, with the first condition being a condition in the first condition set; when each condition in the first condition set is satisfied, the first condition set is satisfied; the first condition set also comprises a second condition, the second condition being a condition in the first condition set; the second condition comprises frequency-domain resources occupied by the first reference signal and frequency-domain resources occupied by the second reference signal being the same;
or, the second time-domain resource block is later than the first time-domain resource block; when the first condition set is satisfied, a phrase of "the power consistency between the first reference signal and the second reference signal" means that a power of the second reference signal follows a power of the first reference signal.

8. The second node according to claim 6, wherein time-frequency resources occupied by the first reference signal and time-frequency resources occupied by the second reference signal are related to whether the first condition set is satisfied; when the first condition set is satisfied, a first reference signal pattern is used to determine the time-frequency resources occupied by the first reference signal and the time-frequency resources occupied by the second reference signal; when the first condition set is not satisfied, a second reference signal pattern is used to determine the time-frequency resources occupied by the first reference signal and the time-frequency resources occupied by the second reference signal; the first reference signal pattern is different from the second reference signal pattern.

9. The second node according to claim 6, comprising:
a second transmitter, transmitting a first signaling;
the second receiver, also receiving a first signal and a second signal respectively in a third time-domain resource block and a fourth time-domain resource block;
wherein the first signaling is used to indicate the third time-domain resource block and the fourth time-domain resource block, the third time-domain resource block and the fourth time-domain resource block being orthogonal, the third time-domain resource block and the fourth time-domain resource block both belong to the reference time window, each of the first signal and the second signal is a first-type signal, the transmitter of the first reference signal and the second reference signal maintains power consistency and phase continuity between the first signal and the second signal; each of the first reference signal and the second reference signal is a first-type reference signal, where the first-type signals are different from the first-type reference signals.

10. The second node according to claim 9, wherein the second receiver also receives a first DeModulation Reference Signal (DMRS) and a second DMRS respectively in the third time-domain resource block and the fourth time-domain resource block; wherein a same DMRS is used for demodulating the first signal and the second signal, the same DMRS including the first DMRS and the second DMRS;
or, when the first condition set is satisfied, a phrase of "the power consistency between the first reference signal and the second reference signal" means that both a power of the first reference signal and a power of the second reference signal are related to a power of the first signal.

11. A method in a first node for wireless communications, comprising:
transmitting a first reference signal and a second reference signal respectively in a first time-domain resource block and a second time-domain resource block;
wherein the first node maintains power consistency and phase continuity among multiple first-type signals belonging to a reference time window in time domain; a duration of the reference time window is not larger than a first threshold; the first time-domain resource block and the second time-domain resource block are orthogonal, at least one of the first time-domain resource block or the second time-domain resource block belonging to the reference time window; the first reference signal and the second reference signal respectively belong to different transmission occasions; whether the first node maintains power consistency and phase continuity between the first reference signal and the second reference signal is related to whether a first condition set is satisfied; when and only when the first condition set is satisfied, the first node maintains the power consistency and phase continuity between the first reference signal and the second reference signal; the first condition set comprises a first condition; the first condition comprises: the first reference signal and the second reference signal being identified by a same index, and, the first time-domain resource block and the second time-domain resource block both belonging to the reference time window.

12. The method according to claim 11, wherein the first condition set comprises more than one condition, with the first condition being a condition in the first condition set; when each condition in the first condition set is satisfied, the first condition set is satisfied; the first condition set also comprises a second condition, the second condition being a condition in the first condition set; the second condition comprises frequency-domain resources occupied by the first reference signal and frequency-domain resources occupied by the second reference signal being the same;
or, the second time-domain resource block is later than the first time-domain resource block; when the first condition set is satisfied, a phrase of "the power consistency between the first reference signal and the second reference signal" means that a power of the second reference signal follows a power of the first reference signal.

13. The method according to claim 11, wherein time-frequency resources occupied by the first reference signal and time-frequency resources occupied by the second reference signal are related to whether the first condition set is satisfied; when the first condition set is satisfied, a first reference signal pattern is used to determine the time-frequency resources occupied by the first reference signal and the time-frequency resources occupied by the second reference signal; when the first condition set is not satisfied, a second reference signal pattern is used to determine the time-frequency resources occupied by the first reference signal and the time-frequency resources occupied by the second reference signal; the first reference signal pattern is different from the second reference signal pattern.

14. The method according to claim 11, comprising:
receiving a first signaling; and
transmitting a first signal and a second signal respectively in a third time-domain resource block and a fourth time-domain resource block;
wherein the first signaling is used to indicate the third time-domain resource block and the fourth time-domain resource block, the third time-domain resource block and the fourth time-domain resource block being orthogonal, the third time-domain resource block and the fourth time-domain resource block both belong to the reference time window, each of the first signal and the second signal is a first-type signal, the first node maintains power consistency and phase continuity between the first signal and the second signal; each of the first reference signal and the second reference signal is a first-type reference signal, where the first-type signals are different from the first-type reference signals.

15. The method according to claim 14, comprising:
transmitting a first DeModulation Reference Signal (DMRS) and a second DMRS respectively in the third time-domain resource block and the fourth time-domain resource block; wherein a same DMRS is used for demodulating the first signal and the second signal, the same DMRS including the first DMRS and the second DMRS;
or, when the first condition set is satisfied, a phrase of "the power consistency between the first reference signal and the second reference signal" means that both a power of the first reference signal and a power of the second reference signal are related to a power of the first signal.

16. A method in a second node for wireless communications, comprising:
receiving a first reference signal and a second reference signal respectively in a first time-domain resource block and a second time-domain resource block;
wherein a transmitter of the first reference signal and the second reference signal maintains power consistency and phase continuity among multiple first-type signals belonging to a reference time window in time domain; a duration of the reference time window is not larger than a first threshold; the first time-domain resource block and the second time-domain resource block are orthogonal, at least one of the first time-domain resource block or the second time-domain resource block belonging to the reference time window; the first reference signal and the second reference signal respectively belong to different transmission occasions; whether the transmitter of the first reference signal and the second reference signal maintains power consistency and phase continuity between the first reference signal and the second reference signal is related to whether a first condition set is satisfied; when and only when the first condition set is satisfied, the transmitter of the first reference signal and the second reference signal maintains the power consistency and phase continuity between the first reference signal and the second reference signal; the first condition set comprises a first condition; the first condition comprises: the first reference signal and the second reference signal being identified by a same index, and, the first time-domain resource block and the second time-domain resource block both belonging to the reference time window.

17. The method according to claim 16, wherein the first condition set comprises more than one condition, with the first condition being a condition in the first condition set; when each condition in the first condition set is satisfied, the first condition set is satisfied; the first condition set also comprises a second condition, the second condition being a condition in the first condition set; the second condition comprises frequency-domain resources occupied by the first reference signal and frequency-domain resources occupied by the second reference signal being the same;
or, the second time-domain resource block is later than the first time-domain resource block; when the first condition set is satisfied, a phrase of "the power consistency between the first reference signal and the second reference signal" means that a power of the second reference signal follows a power of the first reference signal.

18. The method according to claim 16, wherein time-frequency resources occupied by the first reference signal and time-frequency resources occupied by the second reference signal are related to whether the first condition set is satisfied; when the first condition set is satisfied, a first reference signal pattern is used to determine the time-frequency resources occupied by the first reference signal and the time-frequency resources occupied by the second reference signal; when the first condition set is not satisfied, a second reference signal pattern is used to determine the time-frequency resources occupied by the first reference signal and the time-frequency resources occupied by the second reference signal; the first reference signal pattern is different from the second reference signal pattern.

19. The method according to claim 16, comprising:
transmitting a first signaling; and
receiving a first signal and a second signal respectively in a third time-domain resource block and a fourth time-domain resource block;
wherein the first signaling is used to indicate the third time-domain resource block and the fourth time-domain resource block, the third time-domain resource block and the fourth time-domain resource block being orthogonal, the third time-domain resource block and the fourth time-domain resource block both belong to the reference time window, each of the first signal and the second signal is a first-type signal, the transmitter of the first reference signal and the second reference signal maintains power consistency and phase continuity between the first signal and the second signal; each of the first reference signal and the second reference signal is a first-type reference signal, where the first-type signals are different from the first-type reference signals.

20. The method according to claim 19, comprising:

receiving a first DeModulation Reference Signal (DMRS) and a second DMRS respectively in the third time-domain resource block and the fourth time-domain resource block; wherein a same DMRS is used for demodulating the first signal and the second signal, the same DMRS including the first DMRS and the second DMRS;

or, when the first condition set is satisfied, a phrase of "the power consistency between the first reference signal and the second reference signal" means that both a power of the first reference signal and a power of the second reference signal are related to a power of the first signal.

* * * * *